United States Patent
Bharadwaj et al.

(10) Patent No.: US 10,136,358 B2
(45) Date of Patent: Nov. 20, 2018

(54) PROCESSING TIME EXTENSION FOR HIGH BANDWIDTH WIRELESS COMMUNICATIONS

(71) Applicant: QUALCOMM Incorporated, San Diego, CA (US)

(72) Inventors: Arjun Bharadwaj, Poway, CA (US); Youhan Kim, San Jose, CA (US); Vishvabhusan Pati, San Jose, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 15/092,467

(22) Filed: Apr. 6, 2016

(65) Prior Publication Data

US 2016/0302104 A1    Oct. 13, 2016

Related U.S. Application Data

(60) Provisional application No. 62/144,216, filed on Apr. 7, 2015.

(51) Int. Cl.
*H04W 28/06* (2009.01)
*H04L 1/00* (2006.01)
*H04L 1/16* (2006.01)

(52) U.S. Cl.
CPC ........... *H04W 28/06* (2013.01); *H04L 1/0042* (2013.01); *H04L 1/1685* (2013.01)

(58) Field of Classification Search
CPC ..... H04W 28/06; H04L 1/1685; H04L 1/0042
See application file for complete search history.

(56) References Cited

U.S. PATENT DOCUMENTS

| | | |
|---|---|---|
| 7,239,648 B1 | 7/2007 | Feng et al. |
| 2006/0036923 A1 | 2/2006 | Hedberg et al. |

(Continued)

FOREIGN PATENT DOCUMENTS

| | | |
|---|---|---|
| JP | 2008270863 A | 11/2008 |
| JP | 2008271312 A | 11/2008 |

OTHER PUBLICATIONS

ISA/EP, International Search Report and Written Opinion of the International Searching Authority, Int'l Application No. PCT/US2016/026332, dated Oct. 21, 2016, European Patent Office, Rijswijk, NL, 22 pgs.

(Continued)

*Primary Examiner* — Phuc Tran
(74) *Attorney, Agent, or Firm* — Holland & Hart LLP/Qualcomm

(57) ABSTRACT

A wireless device may selectively add padding to an end of a data transmission in order to provide adequate time for a receiving device to process the transmitted data and transmit feedback related to the transmitted data. A wireless device may identify a total amount of data capable of being transmitted in a transmission, and determine a number of data bits to be transmitted in the transmission. An amount of padding may be selected based on a proportion of the total amount of data capable of being transmitted and the number of data bits. In some examples, a preamble for a feedback transmission may be transmitted concurrently with processing of the received transmission.

45 Claims, 14 Drawing Sheets

(56) References Cited

U.S. PATENT DOCUMENTS

| | | |
|---|---|---|
| 2010/0226315 A1 | 9/2010 | Das et al. |
| 2011/0216758 A1 | 9/2011 | Hoshihara et al. |
| 2011/0261742 A1 | 10/2011 | Wentink |
| 2012/0218947 A1 | 8/2012 | Merlin et al. |
| 2013/0073927 A1* | 3/2013 | Kasher ............ H04L 1/0057 714/776 |
| 2013/0121244 A1 | 5/2013 | Vermani et al. |
| 2013/0177096 A1* | 7/2013 | Park ............ H04B 7/0452 375/267 |
| 2013/0301551 A1 | 11/2013 | Ghosh et al. |
| 2015/0146653 A1 | 5/2015 | Zhang et al. |
| 2015/0349995 A1 | 12/2015 | Zhang et al. |
| 2016/0302199 A1 | 10/2016 | Bharadwaj et al. |

OTHER PUBLICATIONS

Lee et al., "A Modified Medium Access Control Algorithm for Systems wiih Iterative Decoding", IEEE Transactions on Wireless Communications, Feb. 2006, 4 pgs, vol. 5, No. 2, XP055308687, Institute of Electrical and Electronics Engineers.

ISA/EP, Partial International Search Report of the International Searching Authority, Int'l. App. No. PCT/US2016/026332, dated Jul. 8, 2016, European Patent Office, Rijswijk, NL, 7 pgs.

Zhang et al., "HE PHY Padding and Packet Extension," IEEE 802.11-15/0810, Sep. 12, 2015, 46 pgs., XP_68098035A, Institute of Electrical and Electronics Engineers.

\* cited by examiner

PROCESSING TIME EXTENSION FOR HIGH BANDWIDTH WIRELESS COMMUNICATIONS

CROSS REFERENCES

The present Application for Patent claims priority to U.S. Provisional Patent Application No. 62/144,216 by Bharadwaj et al., entitled "Processing Time Extension for High Bandwidth Wireless Communications," filed Apr. 7, 2015, assigned to the assignee hereof.

BACKGROUND

Field of Disclosure

The following relates generally to wireless communication such as, for example, to processing time extension for high bandwidth wireless communications.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), may include an access point (AP) that may communicate with one or more stations (STAs) or mobile devices. The AP may be coupled to a network, such as the Internet, and may enable a mobile device to communicate via the network (or communicate with other devices coupled to the access point in a service set, e.g., a basic service set (BSS) or extended service set (ESS)). A wireless device may communicate with a network device bi-directionally. For example, in a WLAN, a STA may communicate with an associated AP via downlink (DL) and uplink (UL). From the STA's perspective, the DL (or forward link) may refer to the communication link from the AP to the station, and the UL (or reverse link) may refer to the communication link from the station to the AP. In some cases, an AP or a STA may transmit a relatively large amount of data using relatively high bandwidth, which may require substantial amounts of receive processing at the device receiving the transmission. Techniques for increasing the amount of available processing time for such high bandwidth communications may provide enhanced communications capability for devices that may have insufficient processing capacity to perform such receive processing within established time periods, such as within a short inter-frame space (SIFS), for performing receive processing, and generating and transmitting feedback related to the received transmission.

SUMMARY

The present disclosure may relate to systems, methods, or communications devices for processing time extension for high bandwidth wireless communications. Specifically, in accordance with the present disclosure, a wireless device (e.g., STA or AP) may selectively add padding to an end of a data transmission (e.g., a protocol data unit (PDU)) in order to provide adequate time for a receiving device to process the transmitted data and transmit feedback related to the transmitted data. A wireless device may identify a total amount of data capable of being transmitted in a transmission, and determine a number of data bits to be transmitted in the transmission. An amount of padding may be selected based on a proportion of the total amount of data capable of being transmitted and the number of data bits. In some examples, a total processing time for processing data received in a last symbol of a transmission may be based on processing time available during the last symbol and a frame extension added to the end of the last symbol.

A wireless device (e.g., STA or AP) receiving such a transmission may identify that feedback is to be transmitted for the transmission, generate the feedback, and transmit the feedback within a predetermined period for transmitting such feedback (e.g., following the expiration of a SIFS). In some examples, a preamble for a feedback transmission may be transmitted concurrently with processing of the received transmission. In certain examples, an amount of padding may be determined and a feedback transmission initiated following the amount of padding and an established time period (e.g., a SIFS).

A method of communication at a wireless device is described. The method may include identifying an upper bound for a number of data bits capable of being transmitted in a symbol to be transmitted to a receiver, determining a number of data bits to be transmitted to the receiver in the symbol, and selectively adding padding to an end of a protocol data unit (PDU) containing the symbol, wherein an amount of the padding is based at least in part on a ratio of the number of data bits to be transmitted and the upper bound for the number of data bits capable of being transmitted in the symbol.

A communications device is described. The communications device may include means for identifying an upper bound for a number of data bits capable of being transmitted in a symbol to be transmitted to a receiver, means for determining a number of data bits to be transmitted to the receiver in the symbol, and means for selectively adding padding to an end of a protocol data unit (PDU) containing the symbol, wherein an amount of the padding is based at least in part on a ratio of the number of data bits to be transmitted and the upper bound for the number of data bits capable of being transmitted in the symbol.

A further communications device is described. The communications device may include a processor and memory communicatively coupled to the processor, the memory may include computer-readable code that, when executed by the processor, causes the communications device to identify an upper bound for a number of data bits capable of being transmitted in a symbol to be transmitted to a receiver, determine a number of data bits to be transmitted to the receiver in the symbol, and selectively add padding to an end of a protocol data unit (PDU) containing the symbol, wherein an amount of the padding is based at least in part on a ratio of the number of data bits to be transmitted and the upper bound for the number of data bits capable of being transmitted in the symbol.

A non-transitory computer-readable medium storing code for communication at a wireless device is described. The code may include instructions executable to identify an upper bound for a number of data bits capable of being transmitted in a symbol to be transmitted to a receiver, determine a number of data bits to be transmitted to the receiver in the symbol, and selectively add padding to an end of a protocol data unit (PDU) containing the symbol, wherein an amount of the padding is based at least in part on a ratio of the number of data bits to be transmitted and the upper bound for the number of data bits capable of being transmitted in the symbol.

In some examples of the method, communications devices, or non-transitory computer-readable medium described above, the padding provides additional time relative to a short interframe space (SIFS) for processing the number of data bits to be transmitted in the at least one symbol. Additionally or alternatively, some examples may include identifying a plurality of bins of ratios of the number of data bits to be transmitted and the upper bound, and determining the amount of padding based at least in part on which of the plurality of bins corresponds to the ratio of the number of data bits to be transmitted and the upper bound.

In some examples of the method, communications devices, or non-transitory computer-readable medium described above, each of the plurality of bins corresponds to an integer multiple of a predetermined amount of padding to be added to the end of the PDU. Additionally or alternatively, some examples may include transmitting an indication of the bin to the receiver.

In some examples of the method, communications devices, or non-transitory computer-readable medium described above, the device is an access point (AP) in a wireless communication network, and wherein the identifying, determining, and selectively adding are performed for each of a plurality of stations (STAs) wireless communications with the AP. Additionally or alternatively, some examples may include determining a largest amount of padding among the plurality of STAs, and applying the largest amount of padding to each of the plurality of STAs.

In some examples of the method, communications devices, or non-transitory computer-readable medium described above, the device is an access point (AP) in a wireless communication network, and wherein the upper bound for a number of data bits comprises an aggregated number of data bits capable of being transmitted to each of a plurality of stations (STAs) in wireless communications with the AP, and the number of data bits to be transmitted comprises an aggregated number of data bits to be transmitted. Additionally or alternatively, some examples may include transmitting an indication of the amount of padding to each of the plurality of STAs in a trigger message.

A method of communication at a wireless device is described. The method may include receiving at least one protocol data unit (PDU), identifying that acknowledgment/negative acknowledgement (ACK/NACK) feedback is to be generated for the PDU, generating the ACK/NACK feedback for the PDU, and transmitting, concurrently with at least a portion of the generating the ACK/NACK feedback for the PDU and based at least in part on identifying that ACK/NACK feedback is to be generated, a preamble for the ACK/NACK feedback.

A communications device is described. The communications device may include means for receiving at least one protocol data unit (PDU), means for identifying that acknowledgment/negative acknowledgement (ACK/NACK) feedback is to be generated for the PDU, means for generating the ACK/NACK feedback for the PDU, and means for transmitting, concurrently with at least a portion of the generating the ACK/NACK feedback for the PDU and based at least in part on identifying that ACK/NACK feedback is to be generated, a preamble for the ACK/NACK feedback.

A further communications device is described. The communications device may include a processor and memory communicatively coupled to the processor, the memory may include computer-readable code that, when executed by the processor, causes the communications device to receive at least one protocol data unit (PDU), identify that acknowledgment/negative acknowledgement (ACK/NACK) feedback is to be generated for the PDU, generate the ACK/NACK feedback for the PDU, and transmit, concurrently with at least a portion of the generating the ACK/NACK feedback for the PDU and based at least in part on identifying that ACK/NACK feedback is to be generated, a preamble for the ACK/NACK feedback.

A further communications device is described. The communications device may include a receiver to receive at least one protocol data unit (PDU), a feedback manager to identify that acknowledgment/negative acknowledgement (ACK/NACK) feedback is to be generated for the PDU and generate the ACK/NACK feedback for the PDU, and a transmitter to transmit, concurrently with at least a portion of the generating the ACK/NACK feedback for the PDU and based at least in part on identifying that ACK/NACK feedback is to be generated, a preamble for the ACK/NACK feedback.

A non-transitory computer-readable medium storing code for communication at a wireless device is described. The code may include instructions executable to receive at least one protocol data unit (PDU), identify that acknowledgment/negative acknowledgement (ACK/NACK) feedback is to be generated for the PDU, generate the ACK/NACK feedback for the PDU, and transmit, concurrently with at least a portion of the generating the ACK/NACK feedback for the PDU and based at least in part on identifying that ACK/NACK feedback is to be generated, a preamble for the ACK/NACK feedback.

Some examples of the method, communications devices, or non-transitory computer-readable medium described above may further include transmitting the ACK/NACK feedback subsequent to transmitting the preamble for the ACK/NACK feedback. Additionally or alternatively, in some examples the generating the ACK/NACK feedback comprises generating an initial portion of the ACK/NACK feedback before transmitting the preamble for the ACK/NACK feedback, and generating a remaining portion of the ACK/NACK feedback while transmitting the preamble for the ACK/NACK feedback.

In some examples of the method, communications devices, or non-transitory computer-readable medium described above, identifying that ACK/NACK feedback is to be generated for the PDU comprises decoding an ACK policy associated with the PDU prior to transmitting the preamble for the ACK/NACK feedback. Additionally or alternatively, in some examples the at least one PDU comprises a sequence of PDUs, and the ACK policy is transmitted in a first PDU of the sequence of PDUs located near a beginning of the sequence of PDUs.

In some examples of the method, communications devices, or non-transitory computer-readable medium described above, the first PDU comprises a number of data bits below a predetermined threshold of data bits. Additionally or alternatively, in some examples the predetermined threshold is based at least in part on a processing capability of the device.

In some examples of the method, communications devices, or non-transitory computer-readable medium described above, the device is a station (STA) in a wireless communication network that receives communications from an access point (AP) that is in simultaneous communication with a plurality of STAs, and wherein the PDU comprises an ACK policy associated with the PDU for use by the STA in identifying that ACK/NACK feedback is to be generated for the PDU. Additionally or alternatively, in some examples the device is an access point (AP) in a wireless communication network that is in simultaneous communication with a plurality of stations (STAs), and wherein identifying that ACK/NACK feedback is to be generated for the sequence of PDUs comprises identifying that ACK/NACK feedback is to be generated for one or more STAs of the plurality of STAs.

A method of communication at a wireless device is described. The method may include determining a total number of coded data bits in a symbol to be transmitted to a receiver, determining a number of useful coded data bits of the total number of coded data bits in the symbol to be transmitted to the receiver, and adding a frame extension to an end of the symbol based at least in part on a ratio of the number of useful coded data bits and the total number of coded data bits.

A communications device is described. The communications device may include means for determining a total number of coded data bits in a symbol to be transmitted to a receiver, means for determining a number of useful coded data bits of the total number of coded data bits in the symbol to be transmitted to the receiver, and means for adding a frame extension to an end of the symbol based at least in part on a ratio of the number of useful coded data bits and the total number of coded data bits.

A further communications device is described. The communications device may include a processor and memory communicatively coupled to the processor, the memory may include computer-readable code that, when executed by the processor, causes the communications device to determine a total number of coded data bits in a symbol to be transmitted to a receiver, determine a number of useful coded data bits of the total number of coded data bits in the symbol to be transmitted to the receiver, and add a frame extension to an end of the symbol based at least in part on a ratio of the number of useful coded data bits and the total number of coded data bits.

A non-transitory computer-readable medium storing code for communication at a wireless device is described. The code may include instructions executable to determine a total number of coded data bits in a symbol to be transmitted to a receiver, determine a number of useful coded data bits of the total number of coded data bits in the symbol to be transmitted to the receiver, and add a frame extension to an end of the symbol based at least in part on a ratio of the number of useful coded data bits and the total number of coded data bits.

In some examples of the method, communications devices, or non-transitory computer-readable medium described above, a difference between the useful number of coded bits and the total number of coded bits is determined, and an amount of additional processing time comprises a sum of the difference and the frame extension. Additionally or alternatively, in some examples the amount of additional processing time is determined based on a bandwidth used for transmission of the symbol to the receiver.

In some examples of the method, communications devices, or non-transitory computer-readable medium described above, the frame extension is quantized to an integer multiple of a predefined frame extension. Additionally or alternatively, in some examples the amount of additional processing time is determined based at least in part on a modulation and coding scheme (MCS) used for transmission of the symbol to the receiver.

In some examples of the method, communications devices, or non-transitory computer-readable medium described above, the amount of additional processing time is further determined based at least in part on a number of spatial streams transmitted to the receiver. Additionally or alternatively, in some examples the amount of additional processing time is determined based at least in part on a decoding time associated with the number of useful coded data bits.

In some examples of the method, communications devices, or non-transitory computer-readable medium described above, the decoding time is based at least in part on a bandwidth used for transmission of the symbol to the receiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
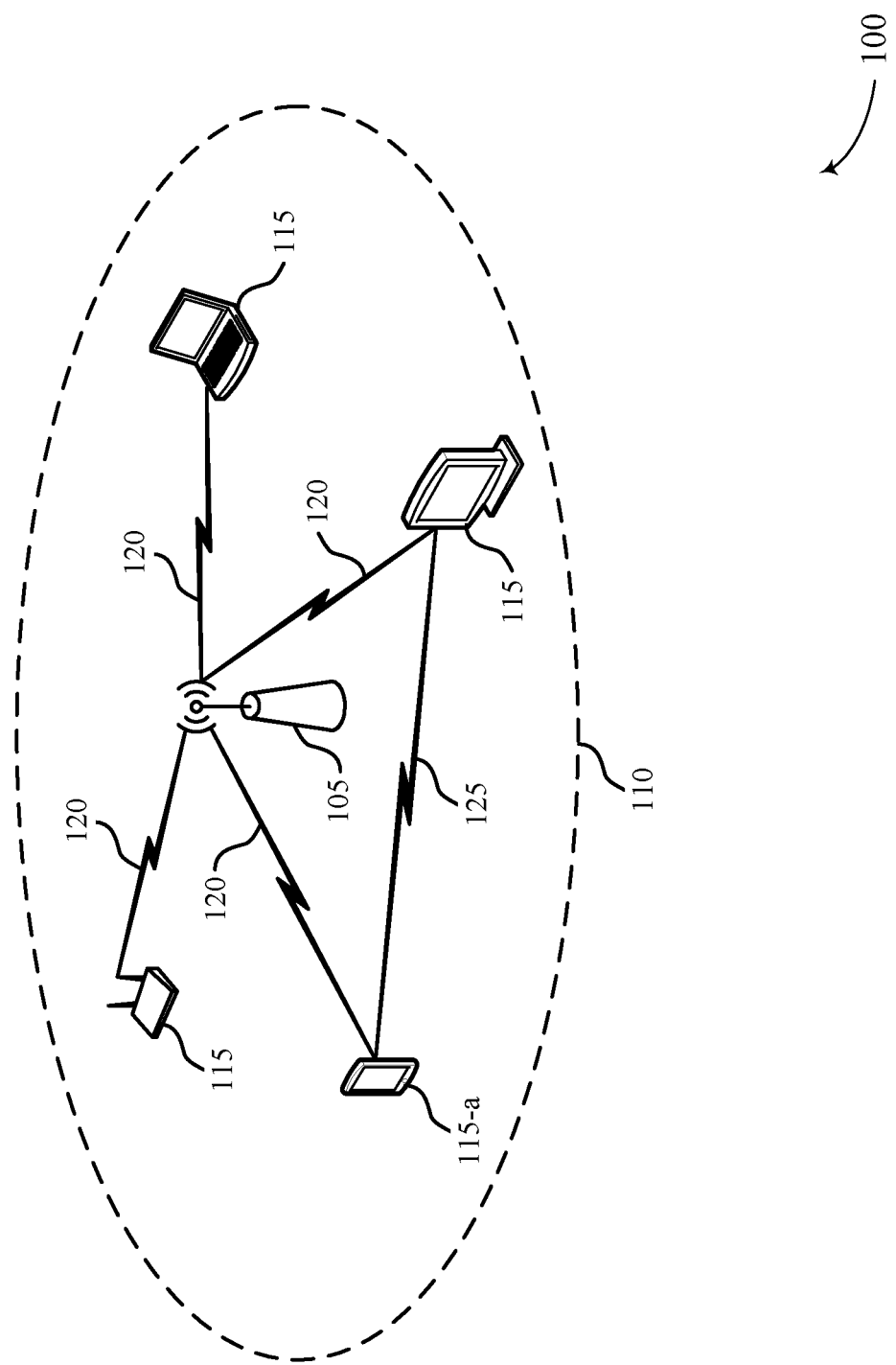
FIG. 1 illustrates a wireless local area network (WLAN) for processing time extension for high bandwidth communications in accordance with various aspects of the present disclosure

The described features generally relate to improved systems, methods, and/or communications devices for processing time extension for high bandwidth wireless communications. High bandwidth transmissions may be used by wireless devices to transmit multiple aggregate media access control (MAC) protocol data units (A-MPDUs) utilizing one or more spatial streams. In some examples, the high-bandwidth transmission may be transmitted according to a wireless communications standard, such as IEEE 802.11ax, which may support relatively high data rates. For example, IEEE 802.11ax may support data rates that are up to four times the data rates supported by IEEE 802.11ac. Furthermore, processing time available according to IEEE 802.11ax at the end of a packet transmission may be set to be the same duration as processing time available according to IEEE 802.11ac (e.g., a 16 µs SIFS). However, due to the increased amount of data that may be transmitted using 802.11ax, certain wireless devices (e.g., STAs or APs) may not have sufficient processing capability to process received transmissions within the processing time available at the end of a packet transmission. For example, a wireless device may need to process four times the number of tones as compared to an IEEE 802.11ac transmission.

Accordingly, various techniques are described for processing time extension for high bandwidth wireless communications. For example, a wireless device (e.g., a STA or an AP) may selectively add padding to an end of a data transmission in order to provide adequate time for a receiving device to process the transmitted data and transmit feedback related to the transmitted data. Padding may be in the form of, for example, a waveform added to the end of the data transmission, and serve as an extension to enable the receiver to complete processing. Such padding for processing time extension may be distinguished from the physical (PHY) or medium access control (MAC) layer padding that may be applied at the end of a packet as in 802.11ac.

In some examples, a wireless device may identify a data capacity of a transmission, and may determine a number of data bits to be actually transmitted in the transmission. An amount of padding may be selected based on a proportion of the capacity of the transmission and the number of data bits. In some examples, a total processing time for processing data received in a last symbol of a transmission may be based on processing time available during the last symbol and a frame extension added to the end of the last symbol.

A wireless device (e.g., a STA or an AP) receiving such a transmission may identify that feedback is to be transmitted for the transmission, generate the feedback, and transmit the feedback within a predetermined period for transmitting such feedback. For example, the transmission may be received, and it may be determined that acknowledgment/negative acknowledgment (ACK/NACK) feedback is to be provided for data in the transmission. The wireless device may perform necessary processing of the data during a frame extension and a SIFS, and transmit the feedback following the SIFS. In some examples, a preamble for a feedback transmission may be transmitted concurrently with processing of the received transmission. In certain examples, a receiving device (e.g., a STA or an AP) may decode signaling indicating an amount of frame extension or padding that is included in a last transmitted PDU, and a feedback transmission initiated following the indicated amount of frame extension or padding and an established time period (e.g., a SIFS). In certain examples, an amount of padding or frame extension may be dynamically modified based at least in part on an amount of data included in a last symbol of a transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a WLAN 100 (also known as a Wi-Fi network) configured in accordance with various aspects of the present disclosure. The WLAN 100 may include an AP 105 and multiple associated stations (STAs) 115, which may represent devices such as smartphones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network may be able to communicate with one another through the AP 105. Also shown is a geographic coverage area 110 of the AP 105, which may represent a basic service area (BSA) of the WLAN 100.

Although not shown in FIG. 1, a STA 115 may be located at the intersection of more than one geographic coverage area 110 and may associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the geographic coverage area 110 of an AP 105 may be divided into sectors (also not shown). The WLAN 100 may include APs 105 of different types (e.g., metropolitan area, home network, etc.), with varying and overlapping geographic coverage areas 110. Two STAs 115 may also communicate directly via a direct wireless link 125 regardless of whether both STAs 115 are in the same geographic coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within the WLAN 100.

In accordance with the present disclosure, a STA 115-a, for example, may be configured to perform processing time extension for high bandwidth wireless communications. For example, STA 115-a may selectively add padding to an end of a data transmission in order to provide adequate time for AP 105 to process the transmitted data and transmit feedback related to the transmitted data. Likewise, AP 105 may be configured to perform processing time extension for high bandwidth wireless communications by selectively add padding to an end of a data transmission in order to provide adequate time for STA 115-a to process the transmitted data and transmit feedback related to the transmitted data. An amount of padding may be selected based on a proportion of the capacity of the transmission and the number of data bits. In some examples, additional processing time may not be provided for a data transmission, and a STA 115 or an AP 105 may transmit a preamble for a feedback transmission concurrently with processing of the received transmission. The received data may continue to be processed during the preamble transmissions to determine the feedback, and the feedback may be transmitted after transmission of the preamble.

In examples that use frame extension, a STA 115 or AP 105 may identify an upper bound for a number of data bits capable of being transmitted in a symbol, and determine an actual number of data bits to be transmitted in the symbol. The STA 115 or AP 105 may add padding to an end of a PDU containing the symbol based at least in part on a ratio of the number of data bits to be transmitted and the upper bound for the number of data bits capable of being transmitted in the symbol. Such padding may be recognized by the receiving device (e.g., AP 105 or STA 115), which may begin receive processing during the time of the padding. The receive processing may continue into a SIFS, and a feedback transmission may be transmitted after the SIFS. Accordingly, the padding may provide additional time relative to the SIFS for processing the transmitted data. In some examples, a number of bins of ratios of the number of data bits to be transmitted and the upper bound may be identified, and the amount of padding may be determined based on a bin for a transmission. In some examples, the bins may correspond to no padding, a first level of padding, and one or more additional levels of padding that correspond to integer multiples of the first level of padding (e.g., bins may correspond to 0 μs, 4 μs, 8 μs, 12 μs, and 16 μs of padding). In some examples, an indication of the bin for padding may be signaled near the beginning of a transmission such that the receiving device (e.g., STA 115 or AP 105) may be able to determine the amount of padding, and may thus start receive processing of the received transmission during the transmission of the padding.

In some examples, an AP 105 may support multi-user transmission/reception, such as downlink (DL) multi-user multiple-input multiple-output (MU-MIMO) or uplink (UL) MU-MIMO. In some examples, for DL MU-MIMO, the AP 105 may be aware of padding requirements for each STA 115, padding levels may be computed on a per-STA 115 basis, and a maximum padding level among all of the STAs 115 may be applied to the frame length of an entire transmission. In such a manner, each STA 115 receiving transmissions may have sufficient time to perform receive processing and generate any necessary feedback. In some examples, for UL MU-MIMO, AP 105 may compute a padding requirement based on an aggregation of the number of data bits per symbol capable of being transmitted by each STA 115. The computed padding requirement may be provided to each STA 115 in a trigger message, such that each STA transmits data with sufficient padding to allow the AP 105 to properly process received transmissions from each of the STAs 115 and provide any necessary feedback. In certain examples, padding levels may be determined on a per-STA 115 basis for UL MU-MIMO transmissions, and the trigger message may include information related to which padding level a particular STA 115 is to use for UL transmissions. In some examples, padding levels may be indicated by signaling indicating which of a number of predefined bins of padding (e.g., 0 μs, 4 μs, 8 μs, 12 μs, and 16 μs) a STA 115 is to use for a transmission.

In some examples, a device, such as an AP 105 of a STA 115 that receives a transmission may receive one or more PDUs. For example, a series of A-MPDUs may be transmitted from AP 105 to STA 115-a. The STA 115-a may identify that ACK/NACK feedback is to be generated for the A-MPDU(s), and generate the associated ACK/NACK feedback. In some examples, the STA 115-a may transmit, concurrently with generating the ACK/NACK feedback, a preamble for the ACK/NACK feedback. In such examples, additional processing time associated with the preamble transmission may allow for completion of the processing of the received data without padding being added to the A-MPDU(s). Following the transmission of the preamble, and STA 115-a may transmit the ACK/NACK feedback to AP 105. Of course, it will be readily understood that such techniques may be used for transmissions between STA 115-a and AP 105 as well. In such examples, an initial portion of the ACK/NACK feedback may be generated before transmitting the preamble for the ACK/NACK feedback, and a remaining portion of the ACK/NACK feedback may be generated while transmitting the preamble for the ACK/NACK feedback.

In some cases, data transmitted in an A-MPDU may not require ACK/NACK feedback (e.g., when a transmission includes management or control messages). In order to provide that an ACK/NACK preamble is transmitted only when ACK/NACK feedback is required, some examples may provide signaling of an ACK policy relatively early in the transmission, which may be decoded prior to the time at which the preamble is to be transmitted (e.g., prior to the expiration of the SIFS). If the ACK policy indicates that ACK/NACK feedback is not required, the preamble is not transmitted and receive processing may be performed according to established techniques. If the ACK policy indicates that ACK/NACK feedback is to be provided, the preamble may be transmitted concurrent with receive processing, as mentioned above. In some examples, the ACK policy may be transmitted in a A-MPDU near the beginning of a sequence of A-MPDUs. The A-MPDU that is used to transmit the ACK policy may be selected to include number of data bits below a predetermined threshold of data bits, which may be processed prior to the time for transmission of the preamble. The threshold of data bits may be a predefined threshold, or may be based on a processing capability or class of the receiving device, such as a processing capability or class of a STA 115. Similarly as discussed above, the transmissions may be UL or DL MU-MIMO transmissions, and the ACK policy may be determined and signaled on a per-STA 115 basis.

In some examples that use frame extension, a STA 115 or AP 105 may determine a total number of coded data bits in a symbol to be transmitted, and may determine a number of useful coded data bits of the total number of coded data bits in the symbol to be transmitted. The STA 115 or AP 105 may then add a frame extension to an end of the symbol based at least in part on a ratio of the number of useful coded data bits and the total number of coded data bits. In such examples, the amount of padding added to the end of a transmission may be reduced relative to examples that determine padding based on an upper bound of data capable of being transmitted in a symbol and a number of data bits transmitted in the symbol. In some examples, a transmitting AP 105 or STA 115 may determine a difference between the useful number of coded bits and the total number of coded bits, and determine an amount of frame extension as a sum of this difference and a total amount of processing extension needed to perform receive processing on the received data. In some examples, the amount of additional processing time is determined based on a bandwidth used for the transmission, based on a modulation and coding scheme (MCS) used for the transmission, based on a number of spatial streams transmitted, based on a decoding time for the transmission, or combinations thereof. In certain examples, the frame extension may be quantized to an integer multiple of a predefined frame extension.

Figure 2:
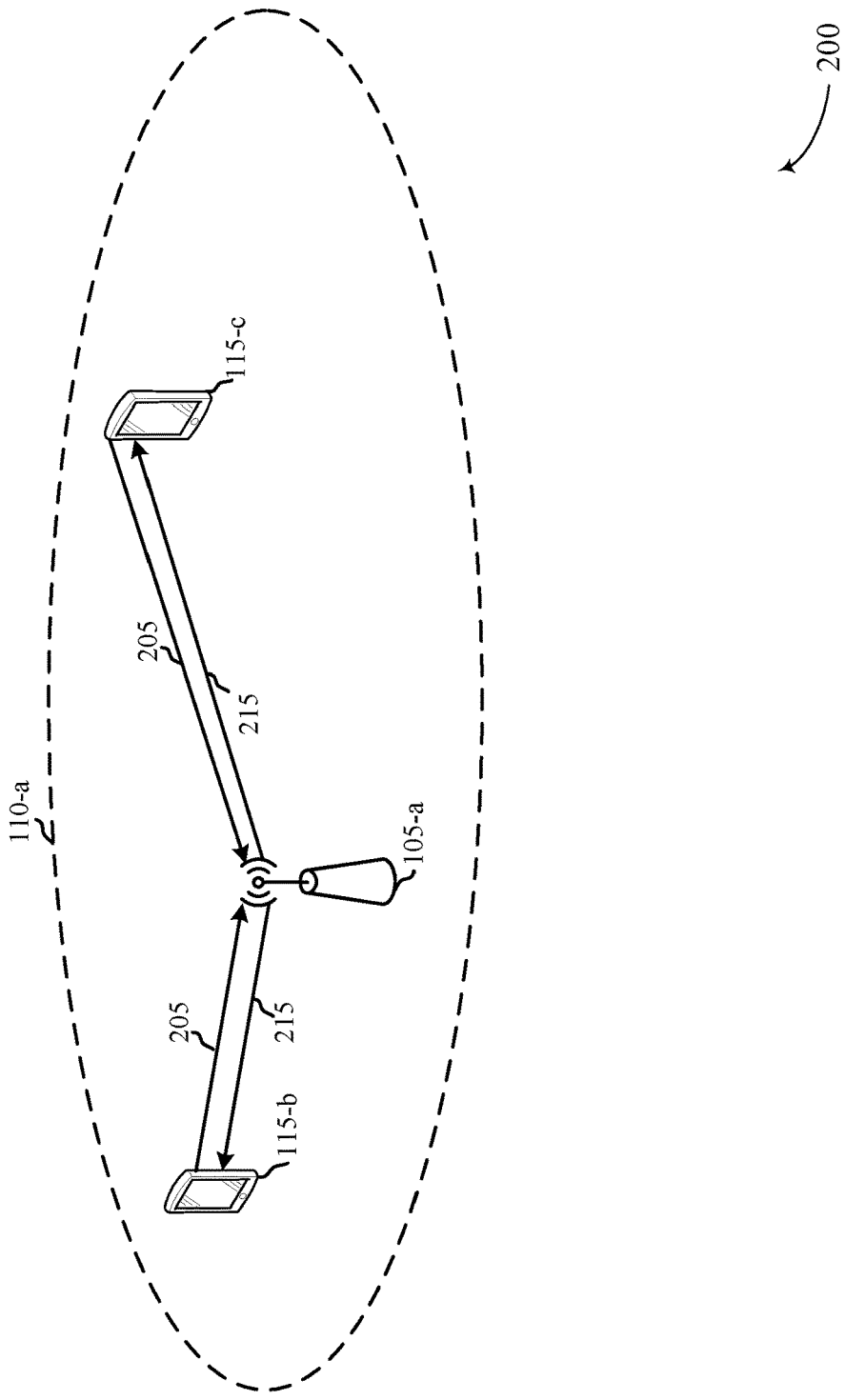
FIG. 2 illustrates an example of a wireless communications subsystem for processing time extension for high bandwidth communications in accordance with various aspects of the present disclosure.

FIG. 2 illustrates an example of a wireless communications subsystem 200 for processing time extension for high bandwidth wireless communications in accordance with various aspects of the present disclosure. Wireless communications subsystem 200 may include STAs 115-*b* and 115-*c*, which may each be examples of a STA 115 described above with reference to FIG. 1. Wireless communications subsystem 200 may also include an AP 105-*a*, which may be an example of an AP 105 described above with reference to FIG. 1.

In accordance with the present disclosure, the processing time for receive processing at a wireless device (e.g., AP 105-*a* or STAs 115) may be adapted to provide sufficient time for receive processing to determine successful receipt and decoding of data, as well as transmission of any required feedback within established time limits (e.g., receive processing within a 16 μs SIFS followed by transmission of feedback information). The time available to perform such receive processing, in some examples, may be modified based at least in part on a number of data bits in a transmission relative to a data capacity of the transmission, as discussed above. In other examples, processing time may be extended through concurrent processing of a received transmission and transmission of a response preamble, also as discussed above. In some examples, STA 115-*b* and STA 115-*a* may transmit an uplink transmission 205 that may include high bandwidth transmissions of data. For example, uplink transmissions 205 may be made according to IEEE 802.1 lax protocols and, according to such protocols, may occupy up to 160 MHz bandwidth and may support up to four spatial streams of data using 256 quadrature amplitude multiplexing (QAM) (i.e., MCS9). AP 105-*a* may receive uplink transmissions 205 and may determine that an ACK policy for the transmissions requires feedback related to successful receipt and decoding of the transmissions, such as ACK/NACK feedback. As mentioned above, uplink transmissions 205 may contain a relatively high number of tones (e.g., up to four times the number of tones as an IEEE 802.11AC transmission), and thus receive processing for the uplink transmissions may require increased amounts of processing resources that may require processing time extension in order to complete before a defined time for transmitting the feedback. AP 105-*a* may perform the receive processing, and transmit the feedback in downlink transmissions 215 to STAs 115. Likewise, AP 105-*a* may transmit data to STAs 115 in downlink transmissions 215, and STAs 115 may transmit feedback to the AP 105-*a* in uplink transmissions 205, using similar techniques for processing time extension in the event that receive processing will consume more time than is available in a SIFS.

Figure 3:
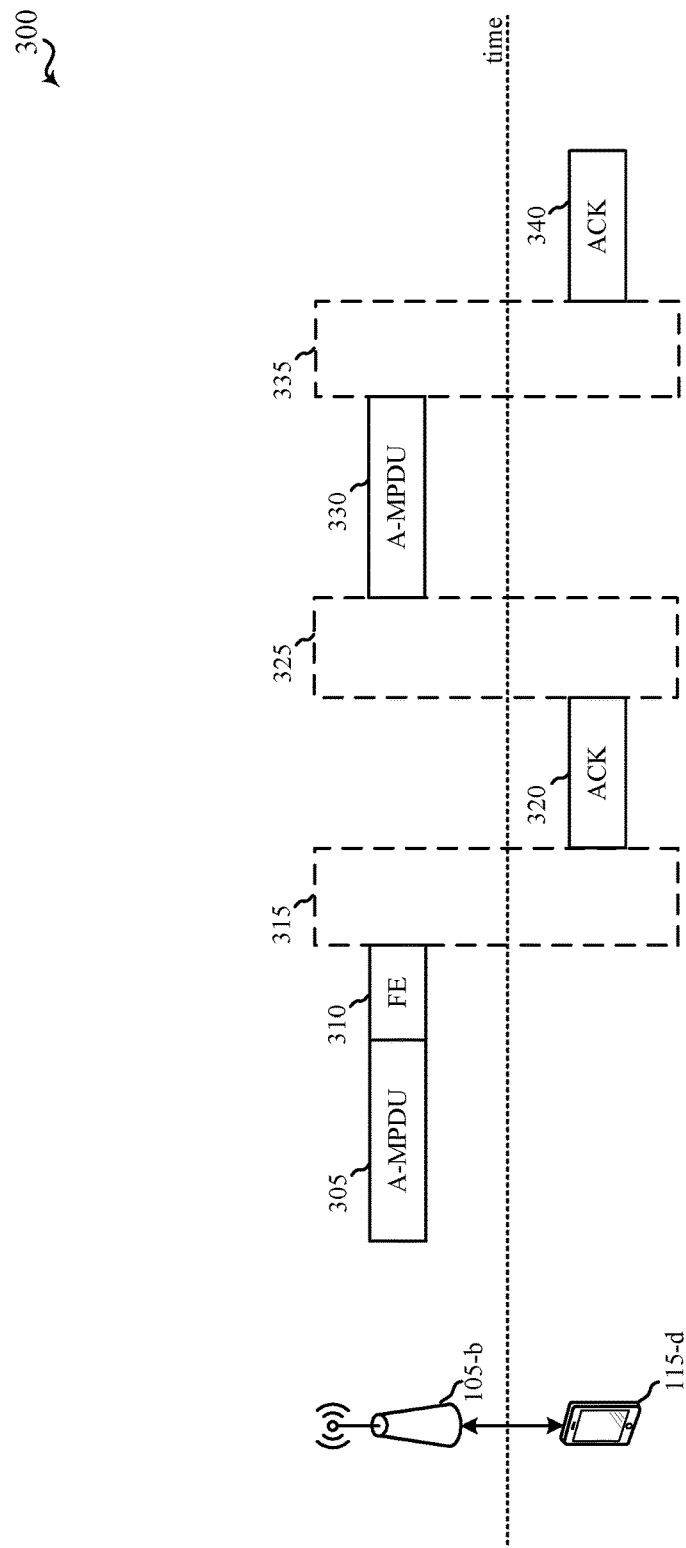
FIG. 3 illustrates an example of communications between an AP and a STA employing processing time extension for high bandwidth communications in accordance with various aspects of the present disclosure.

FIG. 3 illustrates an example of a communication diagram 300 for processing time extension for high bandwidth wireless communications in accordance with various aspects of the disclosure. The communication diagram 300 may include a STA 115-*d*, which may be an example of a STA 115 described above with reference to FIGS. 1-2. The communication diagram 300 may also include an AP 105-*b*, which may be an example of an AP 105 described above with reference to FIGS. 1-2.

The AP 105-*b* may transmit an A-MPDU 305 to the STA 115-*d*. The AP 105-*b*, as part of transmitting the A-MPDU 305 may determine that a frame extension (FE) 310, or padding, is needed in order to provide sufficient time for the STA 115-*d* to perform receive processing on the A-MPDU 305 and generate appropriate feedback regarding whether the A-MPDU 305 was successfully received. The amount of time required for FE 310 may vary, according to some examples, depending upon an amount of data in A-MPDU 305, and an upper bound of data that is capable of being transmitted in A-MPDU 305, as discussed herein. In this example, the first A-MPDU 305 may include a sufficient amount of data to necessitate FE 310 in addition to a first SIFS 315 for receive processing. The duration of FE 310 may vary, in some examples, based on a number of factors as will be discussed in more detail below. Following the first SIFS 315 period, STA 115-*d* may transmit an ACK frame 320 that acknowledges the receipt of the first A-MPDU frame 305. After a second SIFS 325 period, AP 105-*b* may transmit a second A-MPDU 330 to the STA 115-*d*. In this example, second A-MPDU 330 may not require a frame extension, and a second SIFS 335. As mentioned above, in some cases an A-MPDU, such as A-MPDU 330 may include a relatively small amount of data such that STA 115-*d* may perform receive processing within the time period defined by the third SIFS 335 period. Following third SIFS 335 period, the STA 115-*d* may transmit an ACK frame 340 that acknowledges the receipt of the second A-MPDU frame 330.

Figure 4:
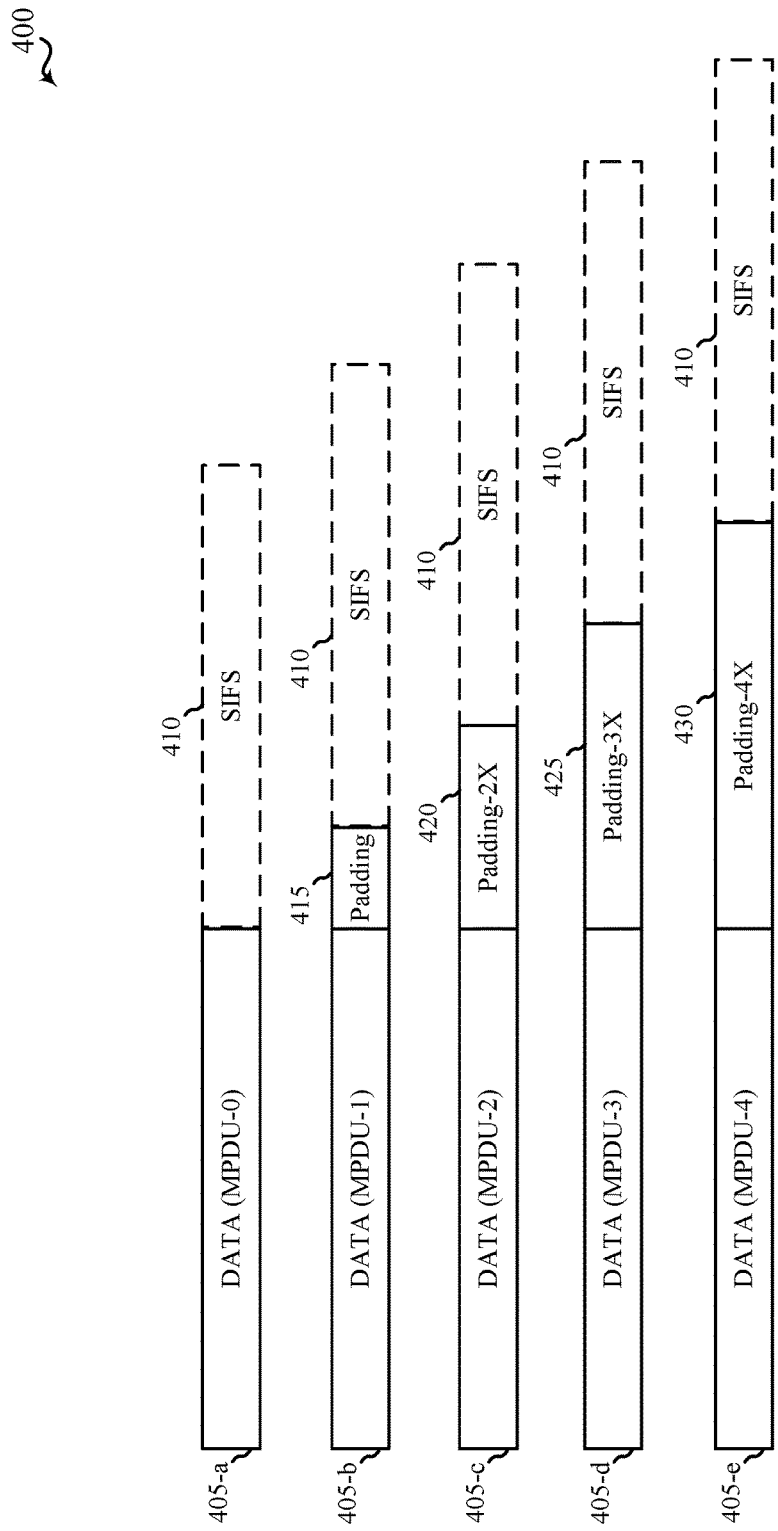
FIG. 4 illustrates an example of different padding that may be selectively added in communications between APs and STAs in accordance with various aspects of the present disclosure.

FIG. 4 illustrates an example 400 of variable padding that may be used for different data transmissions to provide for processing time extension for high bandwidth wireless communications in accordance with various aspects of the disclosure. In this example, different data transmissions 405 may require different amounts of padding in order to provide adequate time for receive processing at a receiver. The data transmissions 405 may be transmitted between a STA, such as a STA 115 of FIGS. 1-3, and an AP 105, such as an AP 105 of FIGS. 1-3. In the example of FIG. 4, an initial data transmission 405-*a* may transmit MPDU-0, which may not require any padding, followed by SIFS 410. The initial data transmission 405-*a* may, for example, have a number of data bits per symbol ($N_{dbps\_ppdu}$) that is less than a predetermined ratio ($\alpha_1$) times a maximum number (or upper bound) of data bits per symbol ($N_{dbps\_max}$) capable of being transmitted to a receiver. In some examples, the ratio $$\alpha = \frac{N_{dbps\_ppdu}}{N_{dbps\_max}}$$

and the padding selected for a transmission may be determined based on different data rate bins associated with the data transmissions 405, such as illustrated in Table 1 below.

In the example of FIG. 4 and Table 1, a first data transmission 405-*b* may include a transmission of MPDU-1 that may have a $N_{dbps\_ppdu}$ value that indicates a first padding value 415 is to be added to the data transmission 405-*b* before SIFS 410, as indicated in Table 1. In some examples, the first padding value 415 may be 4 µs, although it will be readily understood that other padding values may be used in various deployments. Continuing with the example of FIG. 4, a second data transmission 405-*c* may transmit MPDU-2 that may have a $N_{dbps\_ppdu}$ value that indicates a second padding value 420 is to be added to the data transmission 405-*c* before SIFS 410, as indicated in Table 1. In some examples, the second padding value may be an integer multiple of the first padding value 415. According to this example, second padding value 420 may be two times the first padding value 410. Thus, continuing with the numerical example above, the second padding value 420 may be 8 µs.

Further continuing with the example of FIG. 4, a third data transmission 405-*d* may transmit MPDU-3 that may have a $N_{dbps\_ppdu}$ value that indicates a third padding value 425 is to be added to the data transmission 405-*d* before SIFS 410, as indicated in Table 1. In some examples, the third padding value again may be an integer multiple of the first padding value 415. According to this example, third padding value 425 may be three times the first padding value 410. Thus, continuing with the numerical example above, the third padding value 425 may be 12 µs. Finally, in the example of FIG. 4, a fourth data transmission 405-*e* may transmit MPDU-4 that may have a $N_{dbps\_ppdu}$ value that indicates a fourth padding value 430 is to be added to the data transmission 405-*e* before SIFS 410, as indicated in Table 1. In some examples, the fourth padding value again may be an integer multiple of the first padding value 415. According to this example, fourth padding value 430 may be four times the first padding value 410. Thus, continuing with the numerical example above, the fourth padding value 430 may be 16 µs.

TABLE 1

| Parameter | Criterion | Padding Requirement |
|---|---|---|
| $\alpha_1$ | $N_{dbps\_ppdu} < \alpha_1 N_{max\_dbps}$ | No padding required |
| $\alpha_2$ | $\alpha_1 N_{max\_dbps} < N_{dbps\_ppdu} < \alpha_2 N_{max\_dbps}$ | Padding-1X (e.g., 4 µs) |
| $\alpha_3$ | $\alpha_2 N_{max\_dbps} < N_{dbps\_ppdu} < \alpha_3 N_{max\_dbps}$ | Padding-2X (e.g., 8 µs) |
| $\alpha_4$ | $\alpha_3 N_{max\_dbps} < N_{dbps\_ppdu} < \alpha_4 N_{max\_dbps}$ | Padding-3X (e.g., 12 µs) |
|  | $N_{dbps\_ppdu} >= \alpha_4 N_{max\_dbps}$ | Padding-4X (e.g., 16 µs) |

As mentioned above, in some examples an AP may transmit simultaneously to multiple STAs using DL MU-MIMO or orthogonal frequency division multiplexing (OFDMA) techniques. In such cases, since the AP knows the padding requirements for each STA, padding levels may be computed on a per-STA basis, and a maximum padding level among all the STAs may be applied. Thus, a frame length of an entire transmission is increased accordingly. In examples where multiple STAs may be transmitting simultaneously to an AP using UL MU-MIMO/OFDMA techniques, an AP may compute a padding requirement based on the aggregating the $N_{dbps}$ from all the STAs. In some examples, the selected padding level may be signaled by the AP to each STA through a trigger message. In some examples, an AP may determine different padding levels for different STAs, which also may be signaled to each STA through a trigger message. In examples where different STAs may have different padding levels, a trigger message may include information indicating the padding levels such as through a lookup table of semi-statically signaled padding levels.

Figure 5:
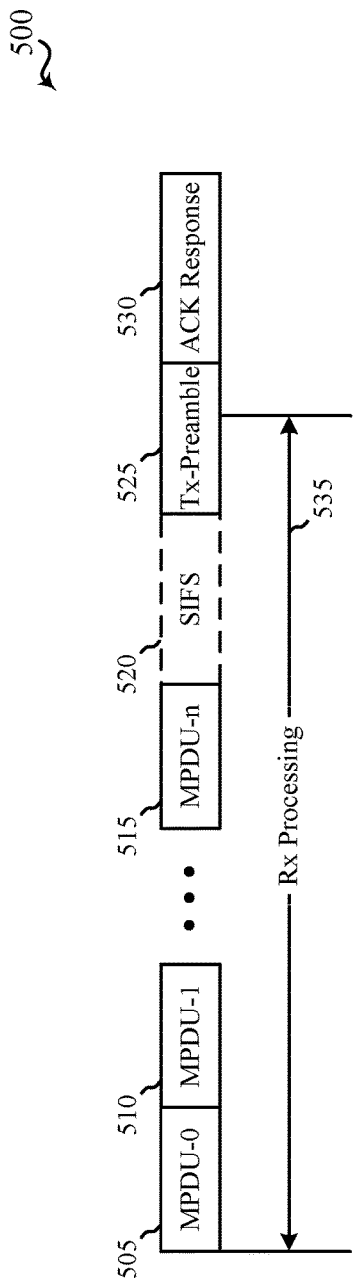
FIG. 5 illustrates an example of concurrent receive processing and feedback preamble transmission in accordance with various aspects of the present disclosure.

As mentioned above, in some examples processing time extensions may be achieved through concurrent processing of received data and transmission of a preamble associated with feedback related to the data. FIG. 5 illustrates an example of concurrent receive processing and preamble transmission to provide for processing time extension for high bandwidth wireless communications in accordance with various aspects of the disclosure. In this example, a data transmission 500 may be transmitted between a STA and an AP 105, such as between a STA 115 and an AP 105 of FIGS. 1-3. In the example of FIG. 5, the data transmission 500 may include a sequence of MPDUs, including MPDU-0 505, MPDU-1 510, through MPDU-n 515. Following the transmission of MPDU-n 515, a SIFS 520 is provided, and a transmission preamble 525 may be transmitted, followed by an ACK response 530 feedback transmission. In this example, concurrent with transmitting the transmission preamble 525, receive processing 535 may be completed. According to some established protocols, such a transmission preamble 525 may not be transmitted until receive processing has been completed. Thus, in the example of FIG. 5, additional processing time during the transmission preamble 525 may provide for processing time extension.

According to some examples, the transmission preamble 525 may include a portion of the response packet that is not dependent upon the value of the feedback, and thus the receive processing 535 need not be completed in order to the transmission preamble 525 to be generated and transmitted. In some examples, the time required for transmission of the transmission preamble 525 may be used to complete processing of the last symbol of MPDU-n 515. For example, the preamble transmission 525 may take 20 µs, and may provide, coupled with SIFS 520, adequate time to complete receive processing 535 and generate ACK response 530. Thus, in such examples, additional padding is not required following the transmission of the last MPDU 515.

As mentioned above, in some cases feedback, such as ACK/NACK feedback, may not be required for all of part of a transmission. In order to determine if feedback is required prior to transmitting the transmission preamble 525, in some examples a MPDU containing MAC address and ACK policy may be decoded within the SIFS 520, and a determination made on whether to send the transmission preamble 525. In some examples, the receiver of the transmission 500 may be identified and an ACK policy may be provided that indicates whether a response is required. In some examples, a relatively small MPDU may be transmitted in the data transmission 500 that may be decoded by the receiver before the end of the SIFS 520. In some examples, a transmitter may provide a first MPDU 505 that is below a threshold MPDU size and that includes a receiver MAC address and ACK policy at the beginning of the MPDU. In some examples, an MPDU size threshold corresponding to an MPDU that may be decoded before SIFS may be predefined, or may be signaled. In some examples, such an MPDU size threshold may vary depending on capabilities of the receiver, and may be defined by a class of the device.

As mentioned above, in some examples an AP may transmit simultaneously to multiple STAs using DL MU-MIMO/OFDMA techniques. In examples that provide processing extension through concurrent sending of a transmission preamble, an AP may determine an MPDU size threshold for each STA that is to receive transmissions, and data packets for each STA may be created accordingly, with a first MPDU including a MAC address and ACK policy for each STA. For UL MU-MIMO/OFDMA operation, an AP needs to be identified and aware of the ACK policy for each STA, and an MPDU from each STA may potentially need to be decoded within SIFS 520. Such operations may require a significant amount of processing resources, but in many cases may be feasible because an PA may have sufficient processing resources. In cases where an AP may not have sufficient processing resources, the AP may schedule resources based on available processing resources. In some examples, a byte threshold for first MPDU 505 may be based on the total number of scheduled STAs communicating with the AP. In some examples, the total number of STAs that may simultaneously communicate with AP may be conservatively defined based on the maximum number of STAs or indicated in a trigger message.

Figure 6:
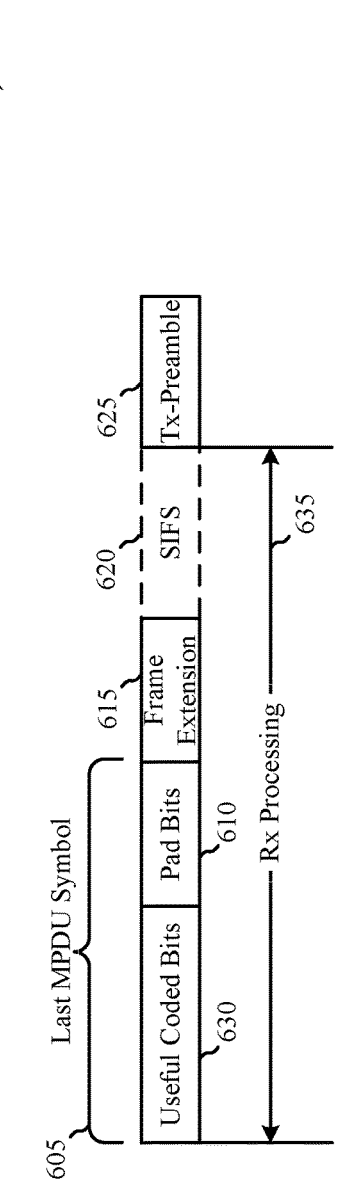
FIG. 6 illustrates an example of frame extension based on useful coded bits in a PDU in communications between APs and STAs in accordance with various aspects of the present disclosure.

FIG. 6 illustrates an example of variable frame extension that may be based on useful coded bits in a MPDU to provide for processing time extension for high bandwidth wireless communications in accordance with various aspects of the disclosure. In this example, data transmissions 600 may include different amounts of frame extension in order to provide adequate time for receive processing at a receiver. The data transmissions 600 may be transmitted between a STA and an AP, such as a STA 115 and AP 105 of FIGS. 1-3. In the example of FIG. 6, data transmissions 600 may include a last MPDU symbol 605, a number of pad bits 610, and a frame extension 615 transmitted by a transmitter. Following SIFS 620, a receiver may send a transmission preamble 625, in a manner similarly as discussed above. Receive processing 635 may be performed by the receiver through SIFS 620, and prior to sending of the transmission preamble 625. In the example of FIG. 6, frame extension 615 may be based on the number of useful coded bits in the last MPDU symbol 605 (e.g., based on MCS of the last MPDU symbol 605, the number of pad bits 610, etc.). In such a manner, the frame extension 615 may be based on a ratio of the number of useful coded data bits 620 and the total number of coded data bits which may include the useful coded data bits 620 and pad bits 610. According to some examples, the frame extension 615 may be the total amount of additional processing time (in addition to SIFS 620) required to complete receive processing of the last MPDU symbol 605. The frame extension (FE) 615 may be a signal added to end of the last MPDU symbol 605 and associated pad bits 610 to delay SIFS 620 and allow for more processing time. In certain examples, a variable $T_{pad}$ may be defined as an amount of associated with the pad bits 610, and that may be used in determining the number of useful coded bits in last MPDU symbol 605.

According to some examples, the total available processing time for receive processing and generation of an appropriate feedback transmission may be determined as a sum of the frame extension 615 and the SIFS 620. In some examples, sum of the variable $T_{pad}$, the frame extension 615 and SIFS 620 may be represented as:

$$T_{pad} + FE + SIFS$$

in which $T_{pad} = 12.8(1-\alpha)$, and where $$\alpha = \frac{N_{cbps_u}}{N_{cbps}},$$

and where $N_{cbps\_u}$ is the number of useful coded bits 630 in the last MPDU symbol 605, and $N_{cbps}$ is the total number of coded bits in the last MPDU symbol 605. FE is the frame extension 615 added to the end of the last MPDU symbol 605 and, in some examples, may take values of zero or an integer multiple of a first frame extension value (e.g., 0 μs, 4 μs, 8 μs, or 16 μs). The SIFS value may be the SIFS 620 duration, which may be 16 μs in some examples.

According to certain examples, based on the information discussed above with reference to FIG. 6, a frame extension 615 may be selected from a set of available processing extensions based on a bandwidth used for the transmission of the last MPDU symbol 605. In some examples, receive processing 635 may scale with the bandwidth used for the transmission of the last MPDU symbol 605 primarily based on low density parity check (LDPC) decoding which increases as a function of bandwidth increase. Frame extension 615 may be selected, in some examples, as:

$$FE = (\text{Receive processing time}) - T_{pad} - SIFS$$

in which receive processing time is dependent upon bandwidth. Using the representation for $T_{pad}$ as described above:

$$FE = (\text{Receive processing time}) - 12.8(1-\alpha) - SIFS$$

In some examples, the frame extension may be quantized to an integer number of time units (e.g., units of 4 μs), in which again receive processing time is dependent upon the bandwidth of the transmission:

$$FE = [(\text{Receive processing time}) - 12.8(1-\alpha) - SIFS]$$

In other examples, the frame extension 615 may be selected from a set of available frame extensions based on a bandwidth and an MCS used for the transmission of the last MPDU symbol 605. In some examples, the frame extension 615 may further be based on a number of spatial streams used for the transmission of the last MPDU symbol 605. In such examples, the frame extension 615 may depend on the number of coded bits in the last MPDU symbol 605. Again, the FE 615 may scale with LDPC decoding time, which in some examples may be defined as a function of β, where:

$$\beta = \frac{N_{cbps}}{N_{max\_cbps}}$$

and where $N_{cbps}$ is the total number of coded bits per symbol in the current MPDU; and $N_{max\_cbps}$ is the maximum number of coded bits per symbol assuming the maximum MCS and the maximum supported bandwidth for the receiver (note: $N_{cbps}$ is not the number of useful bits but rather the total number of coded bits per symbol). Additionally, the number of spatial streams may be accounted for in a similar fashion. Further, similarly as described above, the FE 615 may be quantized to an integer number of time units (e.g., units of 4 μs).

In further examples, the frame extension 615 may be selected from a set of available frame extensions based on a number of useful coded bits in a transmission, along with bandwidth and an MCS used for the transmission of the last MPDU symbol 605. The frame extension 615 may further be based on a number of spatial streams used for the transmission of the last MPDU symbol 605, in some examples. The frame extension 615, as mentioned, may depend on the number of useful coded bits in the last MPDU symbol 605 and the processing extension 635. Again, the FE 615 may scale with LDPC decoding time, which in some examples may be defined as a function of β, where:

$$\beta = \frac{N_{cbps\_u}}{N_{max\_cbps}} = \alpha \frac{N_{cbps}}{N_{max\_cbps}}$$

and where $$\alpha = \frac{N_{cbps\_u}}{N_{cbps}}$$

as discussed above; $N_{cbps\_u}$ is the number of useful coded bits in the last MPDU 605 symbol, and $N_{cbps}$ is the total number of coded bits per symbol in the PDU, and $N_{max\_cbps}$ is the maximum number of coded bits per symbol assuming the maximum MCS and the maximum supported bandwidth for the receiver. Further, similarly as described above, the FE 615 may be quantized to an integer number of time units (e.g., units of 4 μs).

As discussed above, various aspects of such processing time extension may be incorporated into a related protocol or standard, such as one of the IEEE 802.11 standards. A scheme such as discussed with respect to FIG. 6 may be introduced into a related protocol or standard, for example, as follows:

Define:

Required Processing Time Extension ($T_{proc\_ext}$)

$T_{proc\_ext}$=round (3.2β)×4 μs where $$\beta = \frac{N_{cbps\_u}}{N_{max\_cbps}} \text{ or } \beta = \frac{N_{cbps}}{N_{max\_cbps}} \text{ (depends on option)}$$

$T_{proc\_ext}$=$T_{pad}$+FE $T_{pad}$=12.8(1−α)

where $$\alpha = \frac{N_{cbps\_u}}{N_{cbps}}$$

Select FE=$T_{proc\_ext}$−$T_{pad}$

Figure 7:
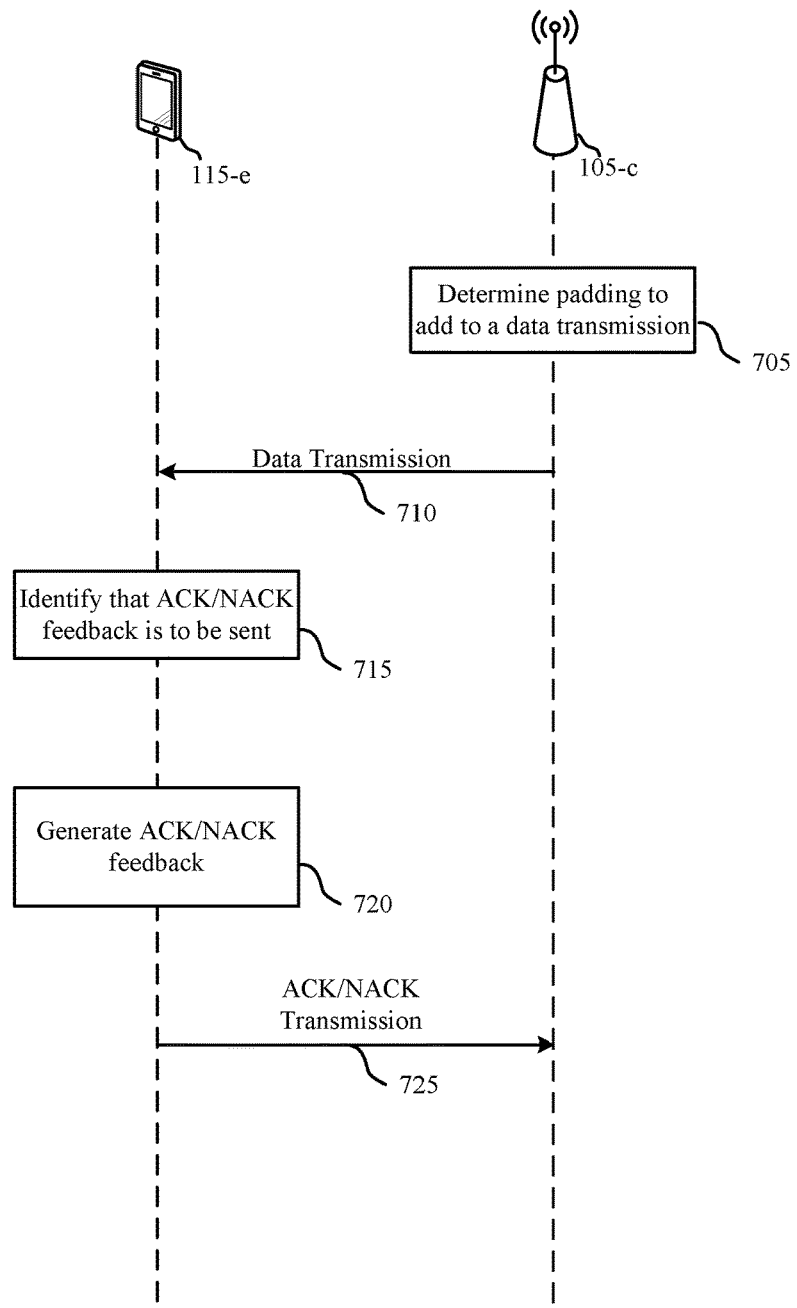
FIG. 7 illustrates an example of communications between an AP and a STA for processing time extension for high bandwidth communications in accordance with various aspects of the present disclosure.

FIG. 7 illustrates an example of a communication diagram 700 for processing time extension for high bandwidth wireless communications in accordance with various aspects of the disclosure. The communication diagram 700 may include a STA 115-*e*, which may be an example of a STA 115 described above with reference to FIGS. 1-6. The communication diagram 700 may also include an AP 105-*c*, which may be an example of an AP 105 described above with reference to FIGS. 1-6.

In the diagram 700 of FIG. 7, the AP 105-*c* may determine a padding to add to a data transmission, as indicated at block 705. Such a determination may be made according to any of the techniques described above with respect to FIG. 1-4 or 6. The AP 105-*a* may transmit the data transmission 710 to STA 115-*e*. The STA 115-*e* may receive the data transmission 710, and identify that ACK/NACK feedback is to be sent in response to the data transmission 710. The STA 115-*e* may perform receive processing in a manner similar as discussed above with respect to FIGS. 1-6, and generate ACK/NACK feedback, as indicated at block 720. The STA 115-*e* may then transmit ACK/NACK transmission 725 to the AP 105-*c*. As discussed above, the ACK/NACK transmission may be sent following a SIFS, and the receive processing by the STA 115-*e* may be performed during a processing extension and the SIFS. While FIG. 7 illustrates an AP 105-*c* transmitting data to STA 115-*e*, it will be readily understood that similar techniques may be used for data transmissions from STA 115-*e* to AP 105-*c*.

Figure 8:
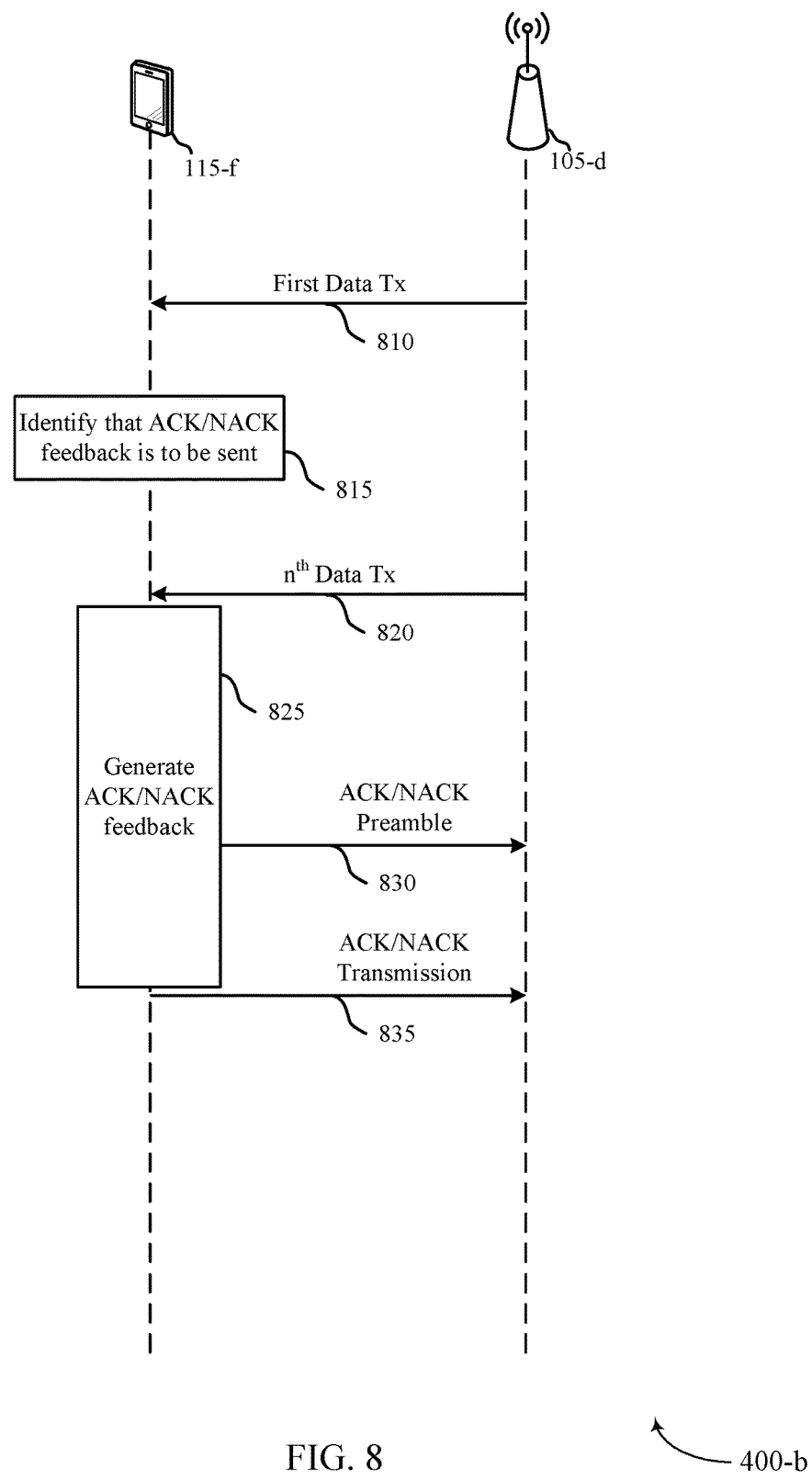
FIG. 8 illustrates an example of communications between an AP and a STA for concurrent receive signal processing and feedback in accordance with various aspects of the present disclosure.

FIG. 8 illustrates an example of a communication diagram 800 for processing time extension for high bandwidth wireless communications in accordance with various aspects of the disclosure. The communication diagram 800 may include a STA 115-*f*, which may be an example of a STA 115 described above with reference to FIGS. 1-6. The communication diagram 800 may also include an AP 105-*d*, which may be an example of an AP 105 described above with reference to FIGS. 1-6.

In the diagram 800 of FIG. 8, the AP 105-*c* may transmit a first data transmission 810 to STA 115-*f*. The STA 115-*f* may identify that ACK/NACK feedback is to be sent in response to received transmissions from AP 105-*e*, as indicated at block 815. Such an identification that ACK/NACK feedback is to be sent may be made according to any of the techniques discussed above with respect to FIGS. 1-6. The AP 105-*c* may transmit an $n^{th}$ data transmission 820 to STA 115-*f*. In some examples, first data transmission 810 and nth data transmission 820 may be first and last MPDUs transmitted in an series of MPDUs. In some examples, only a single data transmission may be sent, in which case the AP 105-*c* would not send $n^{th}$ data transmission 820, and the other operations of FIG. 8 would remain unchanged. At block 825, STA 115-*f* performs receive processing to generate ACK/NACK feedback. During the process of generating ACK/NACK feedback 825, STA 105-*e* may transmit an ACK/NACK preamble 830, in a manner similar as discussed above with respect to FIGS. 1-5. Following generation of ACK/NACK feedback at block 825, STA 115-*f* may send ACK/NACK transmission 835 to AP 105-*d*. While FIG. 7 illustrates an AP 105-*d* transmitting data to STA 115-*f*, it will be readily understood that similar techniques may be used for data transmissions from STA 115-*f* to AP 105-*d*.

Figure 9:
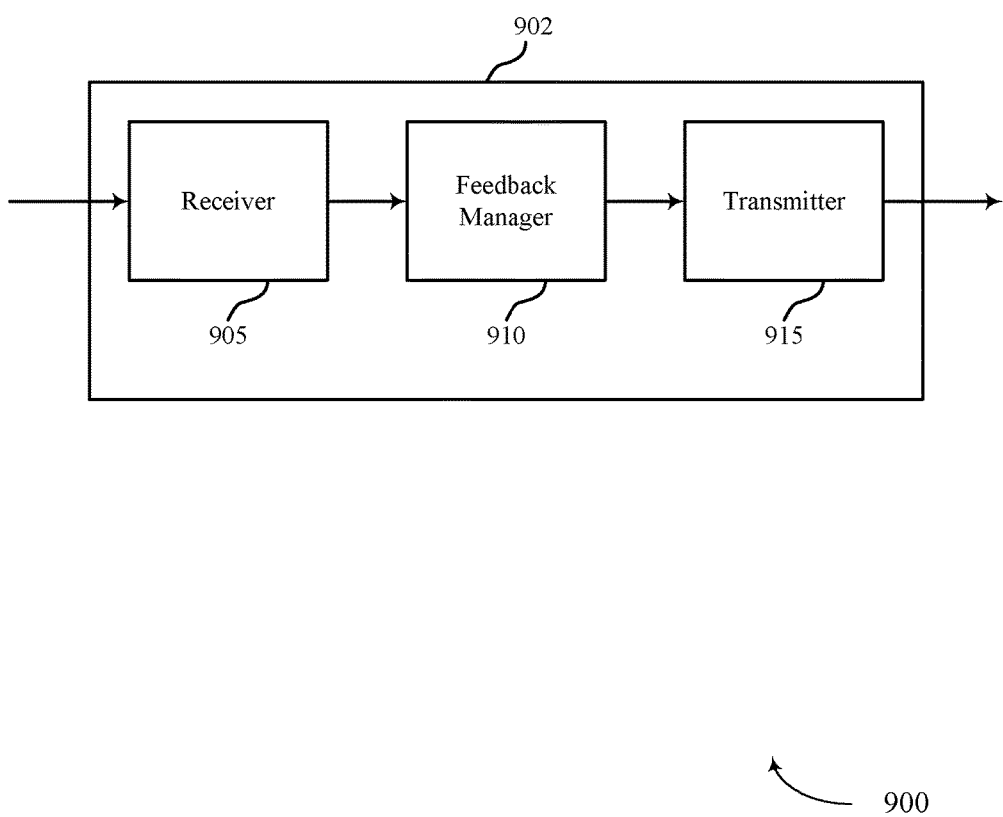
FIG. 9 shows a block diagram of a wireless device configured for processing time extension for high bandwidth communications in accordance with various aspects of the present disclosure.

FIG. 9 shows a block diagram 900 of a wireless device 902 configured for processing time extension for high bandwidth wireless communications in accordance with various aspects of the present disclosure. The wireless device 902 may be an example of aspects of a STA 115 or AP 105 described with reference to FIGS. 1-8. Wireless device 902 may include a receiver 905, a feedback manager 910, or a transmitter 915. Wireless device 902 may also include a processor. Each of these components may be in communication with each other.

The components of wireless device 902 may, individually or collectively, be implemented with at least one application specific integrated circuit (ASIC) adapted to perform some or all of the applicable functions in hardware. Alternatively, the functions may be performed by one or more other processing units (or cores), on at least one IC. Other types of integrated circuits may also be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors. For example, the receiver 905 may be a hardware receiver, the transmitter 915 may be a hardware transmitter, and the feedback manager 910 may be a processor and memory to process and store, respectively, the computer readable medium embodying the actions to be taken by the device to manage the burst traffic.

The receiver 905 may receive information such as packets, user data, or control information associated with various information channels (e.g., control channels, data channels, and information related to processing time extensions, etc.). Information may be passed on to the feedback manager 910, and to other components of wireless device 902.

The feedback manager 910 may monitor traffic information on a channel, identify ACK/NACK feedback, and coordinate padding associated with data transmissions based at least in part on processing extensions associated with receive processing, as discussed above with respect to FIGS. 1-8.

The transmitter 915 may transmit signals received from other components of wireless device 902. The transmitter 915 may be collocated with the receiver 905 in a transceiver module. The transmitter 915 may include a single antenna, or it may include a plurality of antennas. The transmitter 915 may transmit the data transmissions with processing extensions from a first wireless device to a second wireless device, wherein one of the wireless devices is an access point (AP) and the other of the wireless devices is a station. The transmitter 915 may transmit feedback information to the second wireless device.

Figure 10:
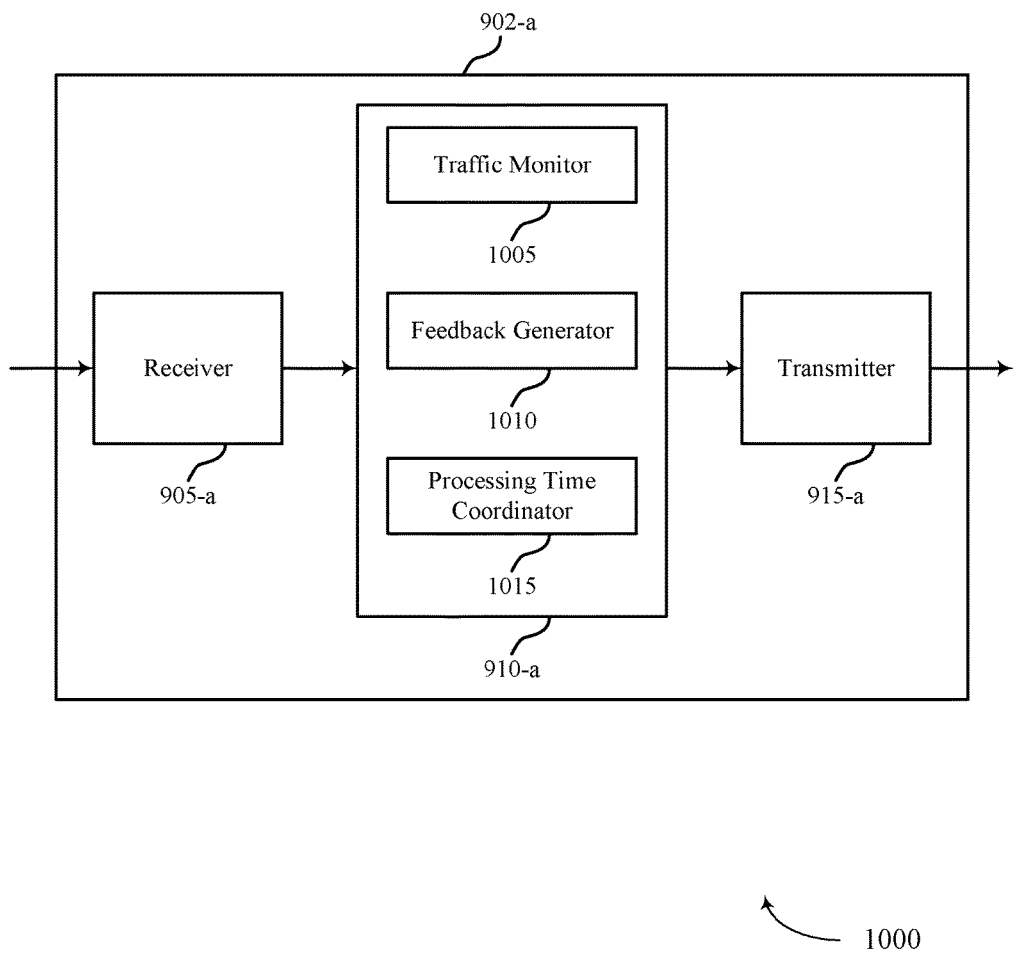
FIG. 10 shows a block diagram of a wireless device configured for processing time extension for high bandwidth communications in accordance with various aspects of the present disclosure.

FIG. 10 shows a block diagram 1000 of a wireless device 902-*a* for processing time extension for high bandwidth wireless communications in accordance with various aspects of the present disclosure. The wireless device 902-*a* may be an example of aspects of the wireless device 902 described with reference to FIG. 9. The wireless device 902-*a* may be an example of aspects of a STA 115 or AP 105 described with reference to FIGS. 1-8. The wireless device 902-*a* may include a receiver 905-*a*, a feedback manager 910-*a*, or a transmitter 915-*a*. The wireless device 902-*a* may also include a processor. Each of these components may be in communication with each other. The feedback manager 910-*a* may also include a traffic monitor 1005, a feedback generator 1010, and a processing time coordinator 1015.

The components of wireless device 902-*a* may, individually or collectively, be implemented with at least one ASIC adapted to perform some or all of the applicable functions in hardware. Alternatively, the functions may be performed by one or more other processing units (or cores), on at least one IC. Other types of integrated circuits may also be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 905-*a* may receive information which may be passed on to the feedback manager 910-*a*, and to other components of wireless device 902-*a*. The feedback manager 910-*a* may perform the operations described above with reference to FIG. 9. The transmitter 915-*a* may transmit signals received from other components of wireless device 902-*a*.

The traffic monitor 1005 may monitor traffic information, including bandwidth of traffic, MCS for traffic, the number of spatial streams of traffic, a number of coded bits included in data transmissions, a number of data bits capable of being transmitted in a data transmissions, or identify an upper bound for a number of data bits capable of being transmitted in a symbol to be transmitted to a receiver, as described above with reference to FIGS. 1-8.

The feedback generator 1010 may perform receive processing and generate feedback, such as ACK/NACK feedback to confirm the successful receipt and decoding of a received data transmission, as described above with reference to FIGS. 1-8.

The processing time coordinator 1015 may adapt a frame extension, select a padding amount, or enable concurrent receive processing and feedback preamble transmission based at least in part on the monitored traffic information (e.g., bandwidth of traffic, MCS for traffic, the number of spatial streams of traffic, a number of coded bits included in data transmissions, or a number of data bits capable of being transmitted in a data transmissions, etc.) as described above with reference to FIGS. 1-8.

Figure 11:
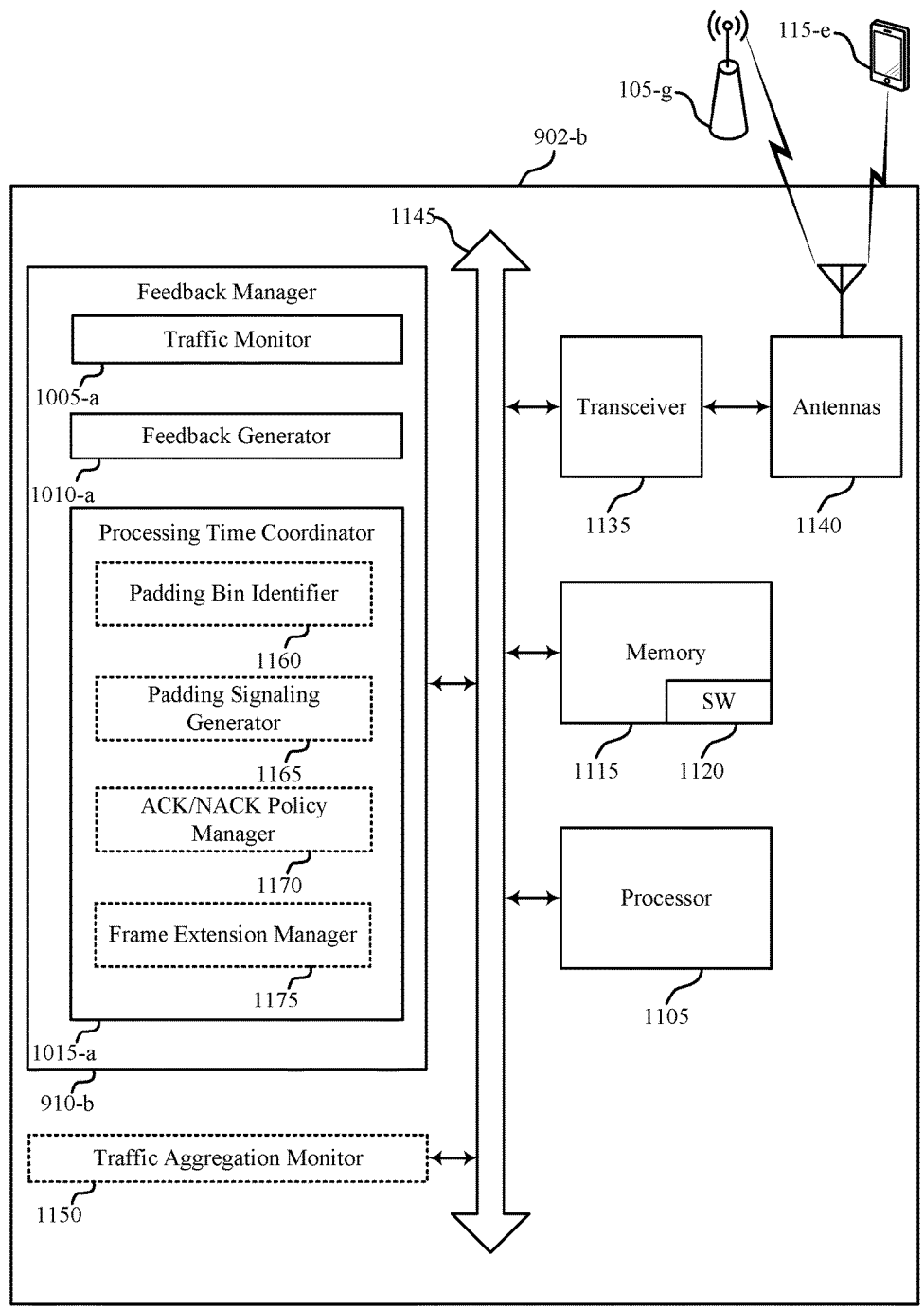
FIG. 11 shows a block diagram of a system including a device configured for processing time extension for high bandwidth communications in accordance with various aspects of the present disclosure.

FIG. 11 shows a diagram of a system 1100 including a wireless device 902-*b* configured for processing time extension for high bandwidth wireless communications in accordance with various aspects of the present disclosure. The system 1100-*a* may include a wireless device 902-*b*, which may be an example of a STA 115 or AP 105 described above with reference to FIGS. 1-8. The wireless device 902-*b* may include a feedback manager 910-*b*, and a traffic aggregation monitor 1150. The feedback manager 910-*b* may be an example of the feedback manager described in FIGS. 9-10, and may include a traffic monitor 1005-*a*, a feedback generator 1010-*a*, and a processing time coordinator 1015-*a*, which may be examples of the traffic monitor 1005, feedback generator 1010, and processing time coordinator 1010 described with reference to FIG. 10. The wireless device 902-*b* may also include components for bi-directional voice and data communications including components for transmitting communications and components for receiving communications. For example, wireless device 902-*b* may communicate bi-directionally with STA 115-*e* or AP 105-*g*.

The wireless device 902-*b* may include a processor 1105, and memory 1115 (storing software (SW)) 1120, a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with an AP 105 or a STA 115. The transceiver 1135 may include a modem to modulate the packets and provide the modulated packets to the antenna(s) 1140 for transmission, and to demodulate packets received from the antenna(s) 1140. While the wireless device 902-*b* may include a single antenna 1140, the wireless device 902-*b* may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., processing time extension for high bandwidth wireless communications, etc.). Alternatively, the computer-executable software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an ASIC, etc.).

The traffic monitor 1005-*a*, feedback generator 1010-*a*, and processing time coordinator 1015-*a* may perform the functions described above with reference to FIG. 10. The processing time coordinator 1015-*a* may include a padding bin identifier 1160, a padding signaling generator 1165, an ACK/NACK policy manager 1170, and a frame extension manager 1175.

The traffic monitor 1005-*a*, feedback generator 1010-*a*, processing time coordinator 1015-*a*, and traffic aggregation manager 1150 may, individually or collectively, be implemented with at least one ASIC adapted to perform some or all of the applicable functions in hardware. Alternatively, the functions of these components may be performed by one or more other processing units (or cores), on at least one IC. Other types of integrated circuits may also be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The traffic aggregation monitor 1150 may perform aggregation of traffic transmitted or received to or from multiple devices, such as multiple STAs 115. For example, traffic aggregation monitor 1150 may perform aggregation associated with DL MU-MIMO/OFDMA or UL MU-MIMO/OFDMA and may provide information related to traffic aggregation to feedback manager 910-*b* that may be used for extension of processing time for communications with multiple devices, as described above with reference to FIGS. 1-8.

The padding bin identifier 1160 may identify a padding bin associated with a data transmission, as described above with reference to FIG. 1-8. Additionally or alternatively, the padding bin identifier 1160 may communicate with padding signaling generator 1165 for communications related to signaling a padding bin for a data transmission as described above with reference to FIGS. 1-8. The padding signaling generator 1165, for example, may provide signaling of an address, or a padding bin identifier for a data transmission, as described above with reference to FIGS. 1-8. The ACK/NACK policy manager 1170 may provide an indication of an ACK policy for a data transmission as described above with reference to FIGS. 1-8. The frame extension manager 1175 may select a frame extension may add a frame extension to an end of a data transmission based at least in part on a ratio of a number of useful coded data bits of the data transmission and the total number of coded data bits of the data transmission, as described above with reference to FIGS. 1-8.

Figure 12:
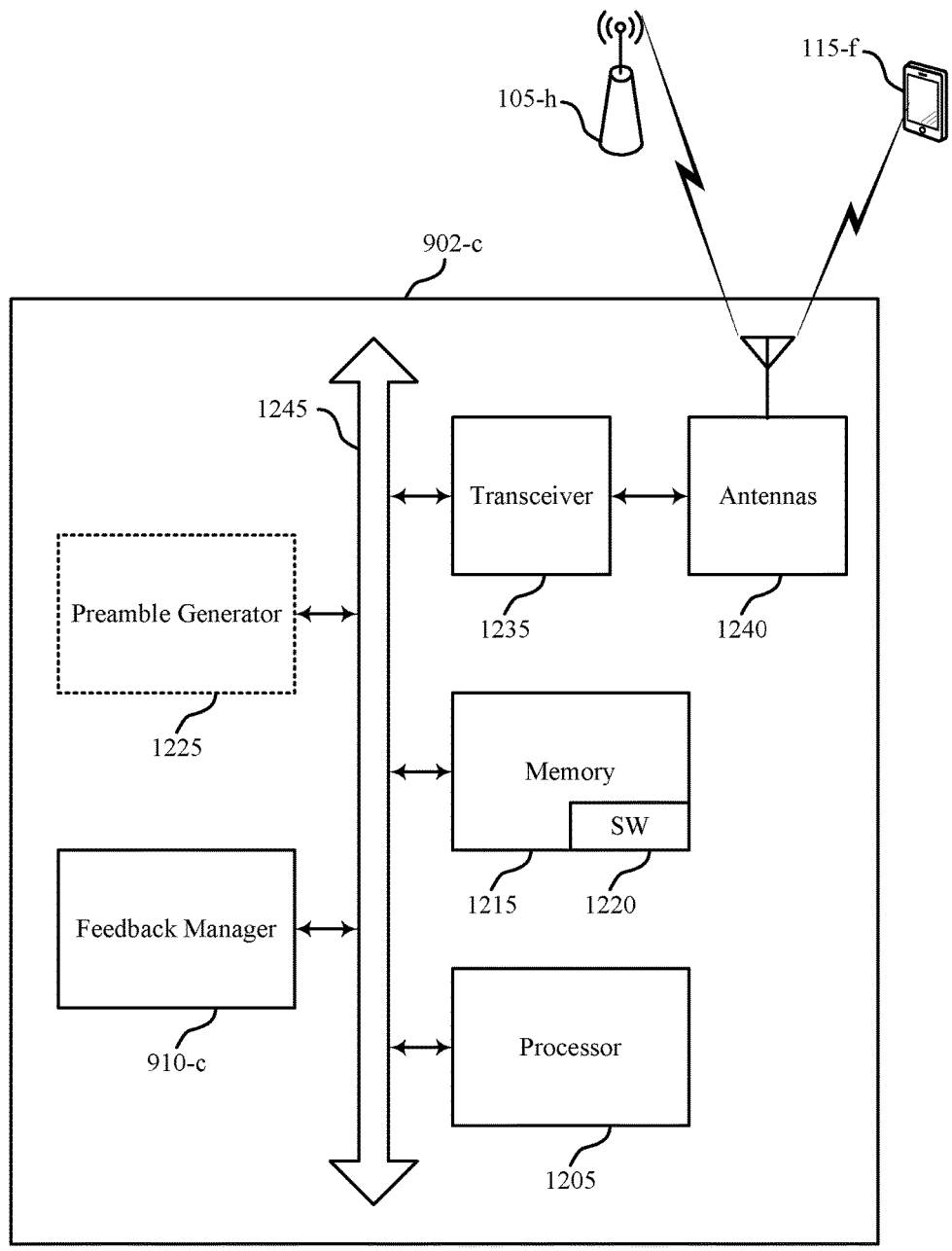
FIG. 12 illustrates a block diagram of a system including a device configured for processing time extension for high bandwidth communications in accordance with various aspects of the present disclosure.

FIG. 12 shows a diagram of a system 1200 including a wireless device 902-*c* configured for processing time extension for high bandwidth wireless communications in accordance with various aspects of the present disclosure. The wireless device 902-*c* may be an example of a STA 115 or AP 105 described above with reference to FIGS. 1-8. The wireless device 902-*d* may include a feedback manager 910-*c*, which may be an example of a feedback manager 910 described with reference to FIGS. 9-10. The wireless device 902-*c* may also include a preamble generator 1225. The wireless device 902-*c* may also include components for bi-directional voice and data communications including components for transmitting communications and components for receiving communications. For example, the wireless device 902-*c* may communicate bi-directionally with STA 115-*f* or AP 105-*h*.

The wireless device 902-*c* may also include a processor 1205, and memory 1215 (storing software (SW)) 1220, a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with an AP 105 or a STA 115. The transceiver 1235 may include a modem to modulate the packets and provide the modulated packets to the antenna(s) 1240 for transmission, and to demodulate packets received from the antenna(s) 1240. While wireless device 902-*c* may include a single antenna 1240, wireless device 902-*c* may also have multiple antennas 1240 capable of concurrently transmitting or receiving multiple wireless transmissions. The preamble generator 1225 may generate a feedback preamble, such as a preamble for an ACK/NACK feedback transmission, concurrently with feedback manager 910-*c* performing receive processing on a received data signal, as described above with reference to FIGS. 1-8. The feedback manager 910-*c* may determine an ACK policy of the received data signal and initiate preamble generator 1225 to generate and send a preamble while the received data signal is being processed, as discussed above.

The memory 1215 may include random access memory (RAM) and read-only memory (ROM). The memory 1215 may store computer-readable, computer-executable software/firmware code 1220 including instructions that, when executed, cause the processor 1205 to perform various functions described herein (e.g., adaptive short inter-frame space bursting, etc.). Alternatively, the computer-executable software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an ASIC, etc.).

Figure 13:
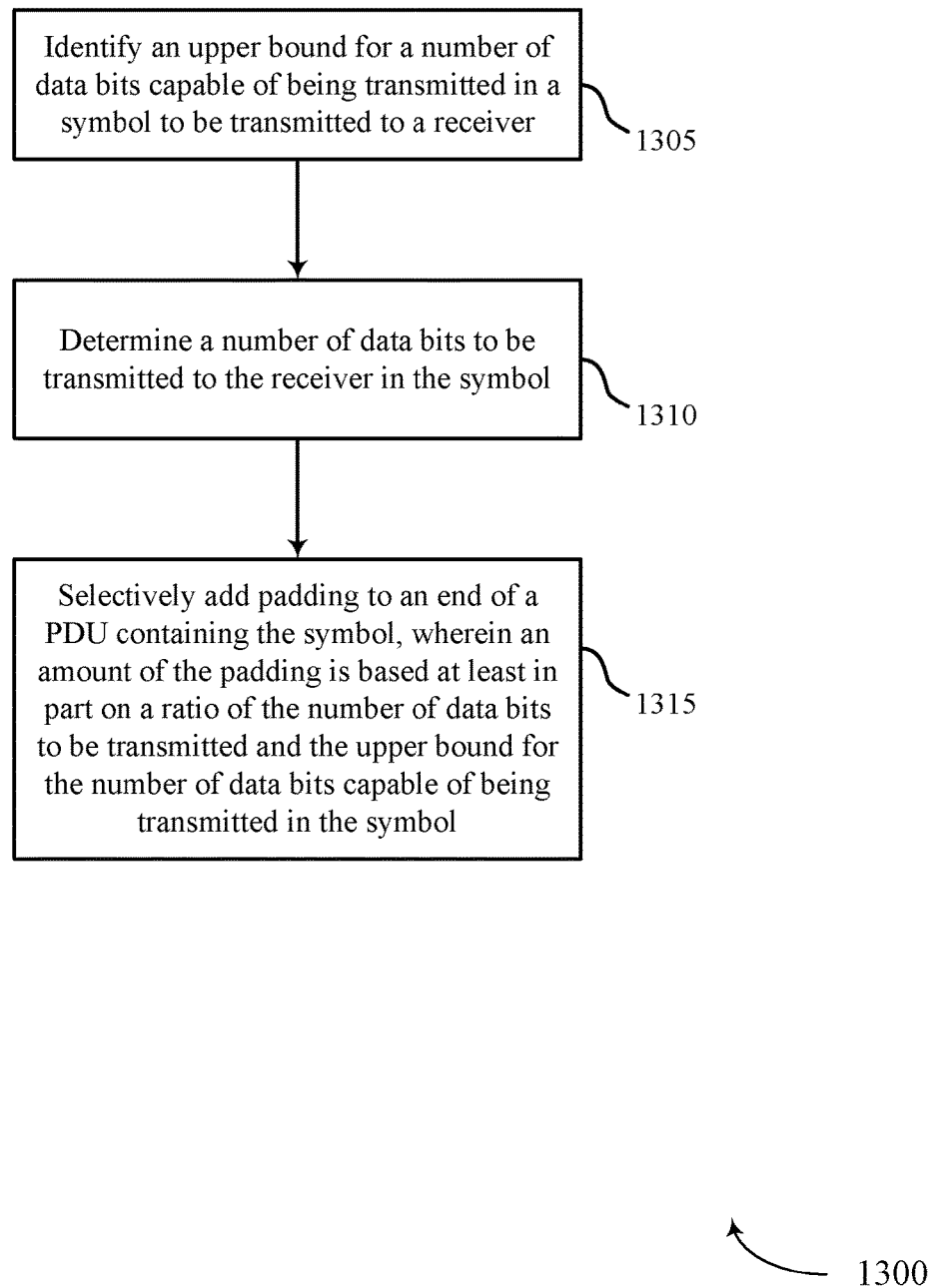
FIG. 13 shows a flowchart illustrating a method for processing time extension for high bandwidth communications in accordance with various aspects of the present disclosure.

FIG. 13 shows a flowchart illustrating a method 1300 for processing time extension for high bandwidth wireless communications in accordance with various aspects of the present disclosure. The operations of method 1300 may be implemented by a wireless device 902, STA 115, AP 105 or its components as described with reference to FIGS. 1-9. For example, the operations of method 1300 may be performed by the feedback manager 910 as described with reference to FIGS. 9-12. A wireless device 902 may execute a set of codes to control the functional elements of the wireless device 902 to perform the functions described below. Additionally or alternatively, the wireless device 902 may perform aspects the functions described below using special-purpose hardware.

At block 1305, the wireless device 902 may identify an upper bound for a number of data bits capable of being transmitted in a symbol to be transmitted to a receiver, as described above with reference to FIGS. 1-8. In certain examples, the operations of block 1305 may be performed by the traffic monitor 1005 as described above with reference to FIG. 10. In some examples, the upper bound for a number of data bits may include an aggregated number of data bits capable of being transmitted to each of a plurality of devices.

At block 1310, the wireless device 902 may determine a number of data bits to be transmitted to the receiver in the symbol, as described above with reference to FIGS. 1-8. In certain examples, the operations of block 1310 may be performed by the traffic monitor 1005 as described above with reference to FIG. 10. In some examples, the number of data bits to be transmitted comprises an aggregated number of data bits to be transmitted.

At block 1315, wireless device 902 may selectively add padding to an end of a PDU containing the symbol, wherein an amount of the padding is based at least in part on a ratio of the number of data bits to be transmitted and the upper bound for the number of data bits capable of being transmitted in the symbol, as described above with reference to FIGS. 1-8. In certain examples, the operations of block 1315 may be performed by the processing time coordinator 1015 as described above with reference to FIG. 10. In some examples, the wireless device may identify a plurality of bins of ratios of the number of data bits to be transmitted and the upper bound, and determine an amount of padding based at least in part on which of the plurality of bins corresponds to the ratio of the number of data bits to be transmitted and the upper bound. In some examples, each of the bins may correspond to an integer multiple of a predetermined amount of padding to be added to the end of the PDU, and an indication may be transmitted that indicates a bin that corresponds to the ratio of the number of data bits to be transmitted and the upper bound.

Figure 14:
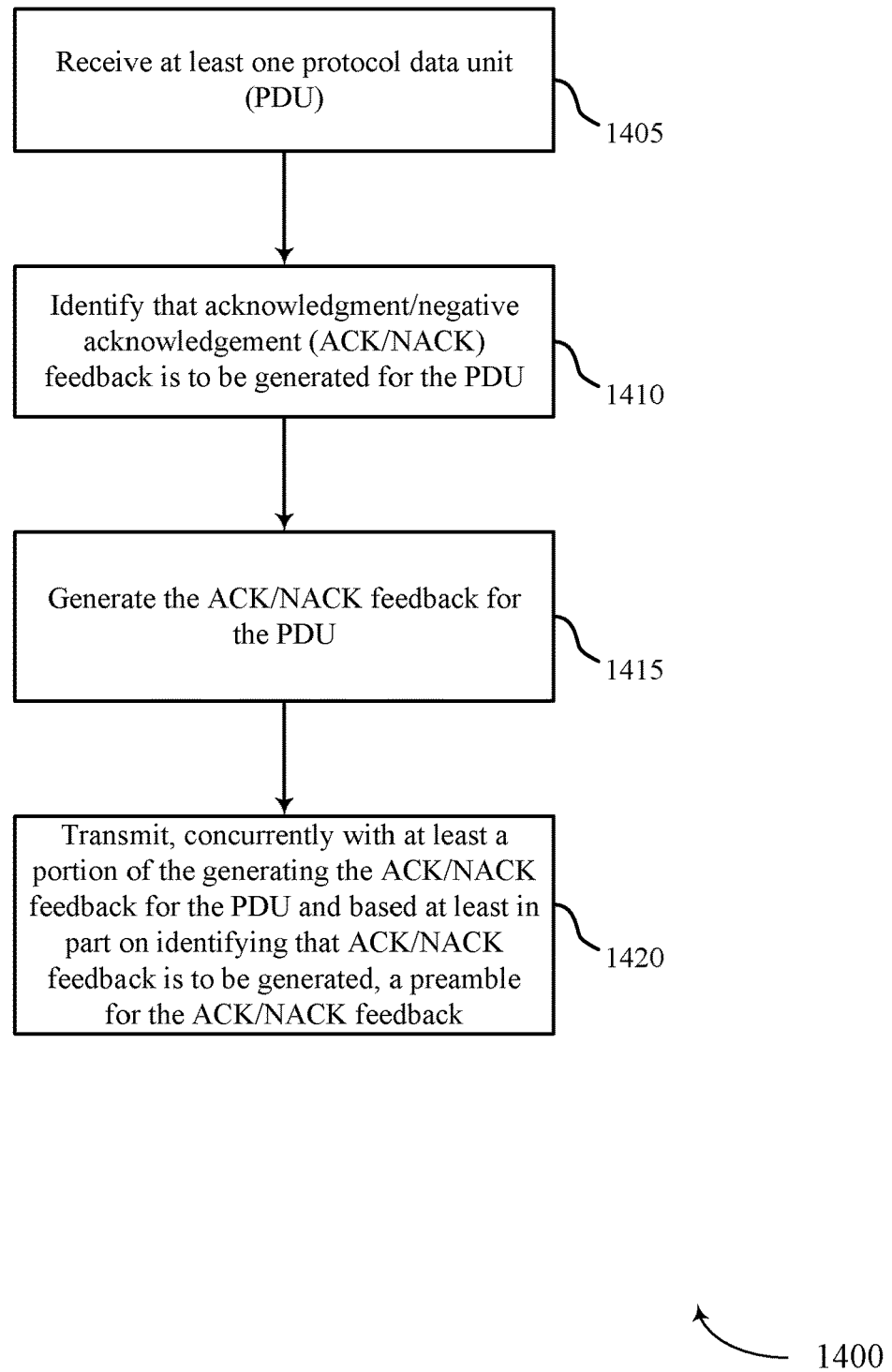
FIG. 14 shows a flowchart illustrating a method for processing time extension for high bandwidth communications in accordance with various aspects of the present disclosure.

FIG. 14 shows a flowchart illustrating a method 1400 for processing time extension for high bandwidth wireless communications in accordance with various aspects of the present disclosure. The operations of method 1400 may be implemented by a wireless device 902, STA 115, AP 105 or its components as described with reference to FIGS. 1-9. For example, the operations of method 1400 may be performed by the feedback manager 910 as described with reference to FIGS. 9-12. A wireless device 902 may execute a set of codes to control the functional elements of the wireless device 902 to perform the functions described below. Additionally or alternatively, the wireless device 902 may perform aspects the functions described below using special-purpose hardware.

At block 1405, the wireless device 902 may receive at least one protocol data unit (PDU), as described above with reference to FIGS. 1-8. In certain examples, the operations of block 1405 may be performed by the receiver 905 as described above with reference to FIGS. 9-10.

At block 1410, the wireless device 902 may identify that acknowledgment/negative acknowledgement (ACK/NACK) feedback is to be generated for the PDU, as described above with reference to FIGS. 1-8. In certain examples, the operations of block 1410 may be performed by the feedback generator 1010 as described above with reference to FIG. 10. In some examples, the identification that ACK/NACK feedback is to be generated may be made based on an ACK policy transmitted in a data transmission.

At block 1415, wireless device 902 may generate the ACK/NACK feedback for the PDU, as described above with reference to FIGS. 1-8. In certain examples, the operations of block 1415 may be performed by the feedback generator 1010 as described above with reference to FIG. 10.

At block 1420, wireless device 902 may transmit, concurrently with at least a portion of the generating the ACK/NACK feedback for the PDU and based at least in part on identifying that ACK/NACK feedback is to be generated, a preamble for the ACK/NACK feedback, as described above with reference to FIGS. 1-8. In certain examples, the operations of block 1420 may be performed by the feedback generator 1010 as described above with reference to FIG. 10. In some examples, the operations of block 1420 may be performed by the preamble generator 1225 as described above with reference to FIG. 12.

Figure 15:
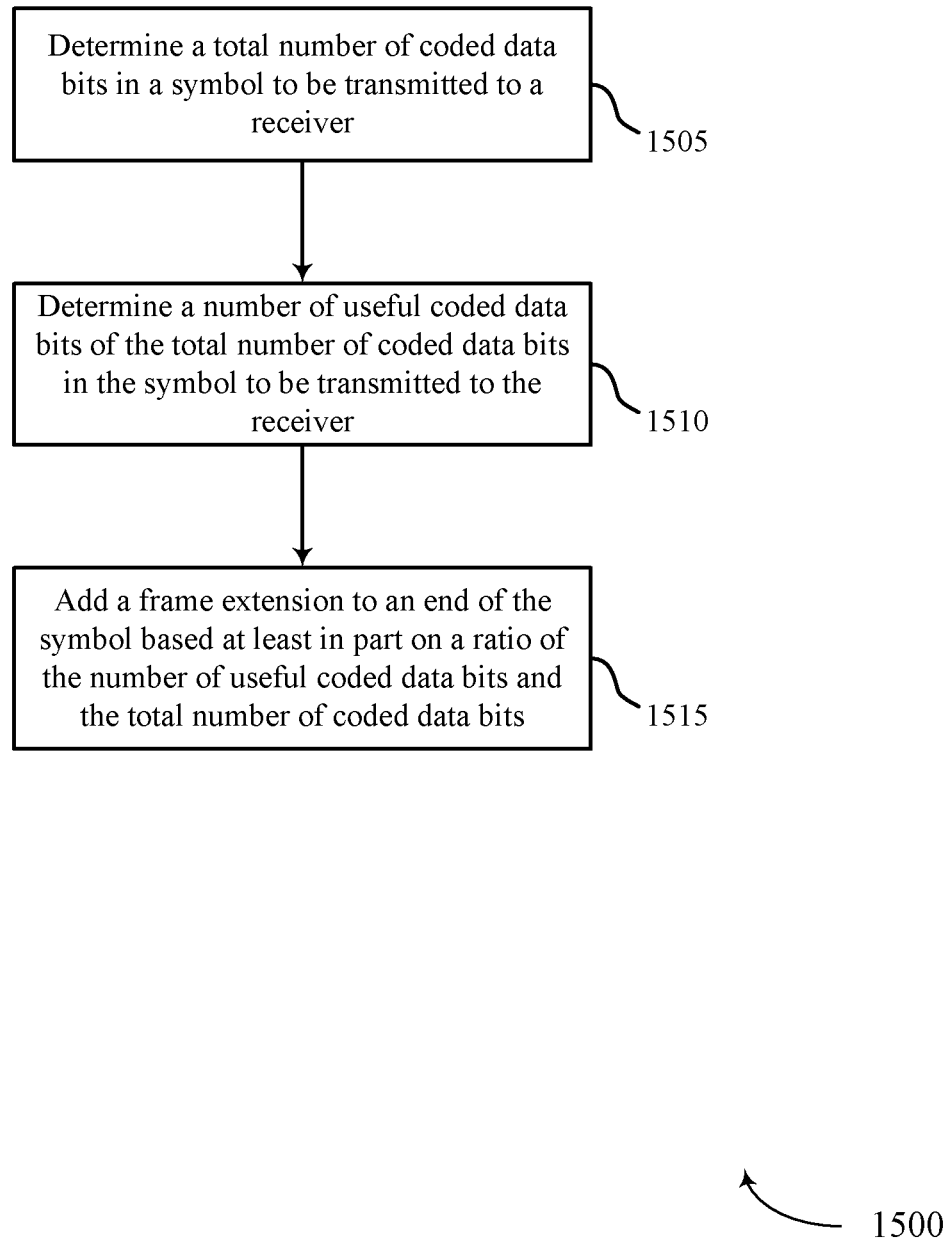
FIG. 15 shows a flowchart illustrating a method for processing time extension for high bandwidth communications in accordance with various aspects of the present disclosure.

FIG. 15 shows a flowchart illustrating a method 1500 for processing time extension for high bandwidth wireless communications in accordance with various aspects of the present disclosure. The operations of method 1500 may be implemented by a wireless device 902, STA 115, AP 105 or its components as described with reference to FIGS. 1-9. For example, the operations of method 1500 may be performed by the feedback manager 910 as described with reference to FIGS. 9-12. A wireless device 902 may execute a set of codes to control the functional elements of the wireless device 902 to perform the functions described below. Additionally or alternatively, the wireless device 902 may perform aspects the functions described below using special-purpose hardware.

At block 1505, the wireless device 902 may determine a total number of coded data bits in a symbol to be transmitted to a receiver, as described above with reference to FIGS. 1-8. In certain examples, the operations of block 1505 may be performed by the traffic monitor 1005 as described above with reference to FIG. 10.

At block 1510, the wireless device 902 may determine a number of useful coded data bits of the total number of coded data bits in the symbol to be transmitted to the receiver, as described above with reference to FIGS. 1-8. In certain examples, the operations of block 1510 may be performed by the traffic monitor 1005 as described above with reference to FIG. 10.

At block 1515, wireless device 902 may add a frame extension to an end of the symbol based at least in part on a ratio of the number of useful coded data bits and the total number of coded data bits, as described above with reference to FIGS. 1-8. In certain examples, the operations of block 1515 may be performed by the processing time coordinator 1015 as described above with reference to FIG. 10.

Thus, methods 1300, 1400, and 1500 may provide for processing time extension for high bandwidth wireless communication. It should be noted that methods 1300, 1400, and 1500 describe possible implementation, and that the operations and the steps may be rearranged or otherwise modified such that other implementations are possible. Aspects from two or more of the methods 1300, 1400, and 1500 may be combined.

The detailed description set forth above in connection with the appended drawings describes examples and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at a wireless device, comprising:
    identifying an upper bound for a number of data bits capable of being transmitted in a symbol to be transmitted to a receiver;
    determining a number of data bits to be transmitted to the receiver in the symbol;
    selectively adding padding to an end of a protocol data unit (PDU) containing the symbol, wherein an amount of the padding is based at least in part on a ratio of the number of data bits to be transmitted and the upper bound for the number of data bits capable of being transmitted in the symbol; and
    transmitting the PDU to the receiver.

2. The method of claim 1, wherein the padding provides additional time relative to a short interframe space (SIFS) for processing the number of data bits to be transmitted in the symbol.

3. The method of claim 1, further comprising:
    identifying a plurality of bins of ratios of the number of data bits to be transmitted and the upper bound; and
    determining an amount of padding based at least in part on which of the plurality of bins corresponds to the ratio of the number of data bits to be transmitted and the upper bound.

4. The method of claim 3, wherein each of the plurality of bins corresponds to an integer multiple of a predetermined amount of padding to be added to the end of the PDU.

5. The method of claim 3, further comprising:
    transmitting, to the receiver, an indication of a bin of the plurality of bins that corresponds to the ratio of the number of data bits to be transmitted and the upper bound.

6. The method of claim 1, wherein the device is an access point (AP) in a wireless communication network, and wherein the identifying, determining, and selectively adding are performed for each of a plurality of stations (STAs) wireless communications with the AP.

7. The method of claim 6, further comprising:
determining a largest amount of padding among the plurality of STAs; and
applying the largest amount of padding to each of the plurality of STAs.

8. The method of claim 1, wherein the device is an access point (AP) in a wireless communication network, and wherein:
the upper bound for a number of data bits comprises an aggregated number of data bits capable of being transmitted to each of a plurality of stations (STAs) in wireless communications with the AP; and
the number of data bits to be transmitted comprises an aggregated number of data bits to be transmitted.

9. The method of claim 8, further comprising:
transmitting an indication of an amount of padding to each of the plurality of STAs in a trigger message.

10. A method of communication at a wireless device, comprising:
determining a total number of coded data bits in a symbol to be transmitted to a receiver;
determining a number of useful coded data bits of the total number of coded data bits in the symbol to be transmitted to the receiver;
adding a frame extension to an end of the symbol based at least in part on a ratio of the number of useful coded data bits and the total number of coded data bits; and
transmitting the symbol to the receiver.

11. The method of claim 10, wherein a difference between the number of useful coded data bits and the total number of coded data bits is determined, and an amount of additional processing time comprises a sum of the difference and the frame extension.

12. The method of claim 11, wherein the amount of additional processing time is determined based on a bandwidth used for transmission of the symbol to the receiver.

13. The method of claim 11, wherein the frame extension is quantized to an integer multiple of a predefined frame extension.

14. The method of claim 11, wherein the amount of additional processing time is determined based at least in part on a modulation and coding scheme (MCS) used for transmission of the symbol to the receiver.

15. The method of claim 14, wherein the amount of additional processing time is further determined based at least in part on a number of spatial streams transmitted to the receiver.

16. The method of claim 11, wherein the amount of additional processing time is determined based at least in part on a decoding time associated with the number of useful coded data bits.

17. The method of claim 16, wherein the decoding time is based at least in part on a bandwidth used for transmission of the symbol to the receiver.

18. A communications device, comprising:
a processor and memory communicatively coupled to the processor, the memory comprising computer-readable code that, when executed by the processor, causes the communications device to:
identify an upper bound for a number of data bits capable of being transmitted in a symbol to be transmitted to a receiver;
determine a number of data bits to be transmitted to the receiver in the symbol;
selectively add padding to an end of a protocol data unit (PDU) containing the symbol, wherein an amount of the padding is based at least in part on a ratio of the number of data bits to be transmitted and the upper bound for the number of data bits capable of being transmitted in the symbol; and
transmit the PDU to the receiver.

19. The communications device of claim 18, wherein the padding provides additional time relative to a short interframe space (SIFS) for processing the number of data bits to be transmitted in the symbol.

20. The communications device of claim 18, wherein the computer-readable code further causes the at least one device to:
identify a plurality of bins of ratios of the number of data bits to be transmitted and the upper bound; and
determine an amount of padding based at least in part on which of the plurality of bins corresponds to the ratio of the number of data bits to be transmitted and the upper bound.

21. The communications device of claim 18, wherein the device is an access point (AP) in a wireless communication network, and wherein:
the upper bound for a number of data bits comprises an aggregated number of data bits capable of being transmitted to each of a plurality of stations (STAs) in wireless communications with the AP; and
the number of data bits to be transmitted comprises an aggregated number of data bits to be transmitted.

22. A communications device, comprising:
a processor and memory communicatively coupled to the processor, the memory comprising computer-readable code that, when executed by the processor, causes the communications device to:
determine a total number of coded data bits in a symbol to be transmitted to a receiver;
determine a number of useful coded data bits of the total number of coded data bits in the symbol to be transmitted to the receiver;
add a frame extension to an end of the symbol based at least in part on a ratio of the number of useful coded data bits and the total number of coded data bits; and
transmit the symbol to the receiver.

23. The communications device of claim 22, wherein a difference between the number of useful coded data bits and the total number of coded data bits is determined, and an amount of additional processing time comprises a sum of the difference and the frame extension.

24. The communications device of claim 23, wherein the amount of additional processing time is determined based on a bandwidth used for transmission of the symbol to the receiver.

25. A communications device, comprising:
means for identifying an upper bound for a number of data bits capable of being transmitted in a symbol to be transmitted to a receiver;
means for determining a number of data bits to be transmitted to the receiver in the symbol;
means for selectively adding padding to an end of a protocol data unit (PDU) containing the symbol, wherein an amount of the padding is based at least in part on a ratio of the number of data bits to be transmitted and the upper bound for the number of data bits capable of being transmitted in the symbol; and
means for transmitting the PDU to the receiver.

26. The communications device of claim 25, wherein the padding provides additional time relative to a short interframe space (SIFS) for processing the number of data bits to be transmitted in the symbol.

27. The communications device of claim 25, further comprising:
   means for identifying a plurality of bins of ratios of the number of data bits to be transmitted and the upper bound; and
   means for determining an amount of padding based at least in part on which of the plurality of bins corresponds to the ratio of the number of data bits to be transmitted and the upper bound.

28. The communications device of claim 27, wherein each of the plurality of bins corresponds to an integer multiple of a predetermined amount of padding to be added to the end of the PDU.

29. The communications device of claim 27, further comprising:
   means for transmitting, to the receiver, an indication of a bin of the plurality of bins that corresponds to the ratio of the number of data bits to be transmitted and the upper bound.

30. The communications device of claim 25, wherein the device is an access point (AP) in a wireless communication network, and wherein the identifying, determining, and selectively adding are performed for each of a plurality of stations (STAs) wireless communications with the AP.

31. The communications device of claim 30, further comprising:
   means for determining a largest amount of padding among the plurality of STAs; and
   means for applying the largest amount of padding to each of the plurality of STAs.

32. The communications device of claim 25, wherein the device is an access point (AP) in a wireless communication network, and wherein:
   the upper bound for a number of data bits comprises an aggregated number of data bits capable of being transmitted to each of a plurality of stations (STAs) in wireless communications with the AP; and
   the number of data bits to be transmitted comprises an aggregated number of data bits to be transmitted.

33. The communications device of claim 32, further comprising:
   means for transmitting an indication of an amount of padding to each of the plurality of STAs in a trigger message.

34. A communications device, comprising:
   means for determining a total number of coded data bits in a symbol to be transmitted to a receiver;
   means for determining a number of useful coded data bits of the total number of coded data bits in the symbol to be transmitted to the receiver;
   means for adding a frame extension to an end of the symbol based at least in part on a ratio of the number of useful coded data bits and the total number of coded data bits; and
   means for transmitting the symbol to the receiver.

35. The communications device of claim 34, wherein a difference between the number of useful coded data bits and the total number of coded data bits is determined, and an amount of additional processing time comprises a sum of the difference and the frame extension.

36. The communications device of claim 35, wherein the amount of additional processing time is determined based on a bandwidth used for transmission of the symbol to the receiver.

37. The communications device of claim 35, wherein the frame extension is quantized to an integer multiple of a predefined frame extension.

38. The communications device of claim 35, wherein the amount of additional processing time is determined based at least in part on a modulation and coding scheme (MCS) used for transmission of the symbol to the receiver.

39. The communications device of claim 38, wherein the amount of additional processing time is further determined based at least in part on a number of spatial streams transmitted to the receiver.

40. The communications device of claim 35, wherein the amount of additional processing time is determined based at least in part on a decoding time associated with the number of useful coded data bits.

41. The communications device of claim 40, wherein the decoding time is based at least in part on a bandwidth used for transmission of the symbol to the receiver.

42. A non-transitory computer-readable medium storing code for communication at a wireless device, the code comprising instructions executable to:
   identify an upper bound for a number of data bits capable of being transmitted in a symbol to be transmitted to a receiver;
   determine a number of data bits to be transmitted to the receiver in the symbol;
   selectively add padding to an end of a protocol data unit (PDU) containing the symbol, wherein an amount of the padding is based at least in part on a ratio of the number of data bits to be transmitted and the upper bound for the number of data bits capable of being transmitted in the symbol; and
   transmit the PDU to the receiver.

43. The non-transitory computer-readable medium of claim 42, wherein the padding provides additional time relative to a short interframe space (SIFS) for processing the number of data bits to be transmitted in the symbol.

44. A non-transitory computer-readable medium storing code for communication at a wireless device, the code comprising instructions executable to:
   determine a total number of coded data bits in a symbol to be transmitted to a receiver;
   determine a number of useful coded data bits of the total number of coded data bits in the symbol to be transmitted to the receiver;
   add a frame extension to an end of the symbol based at least in part on a ratio of the number of useful coded data bits and the total number of coded data bits; and
   transmit the symbol to the receiver.

45. The non-transitory computer-readable medium of claim 44, wherein a difference between the number of useful coded data bits and the total number of coded data bits is determined, and an amount of additional processing time comprises a sum of the difference and the frame extension.

* * * * *